US012754429B2

(12) United States Patent
Melville et al.

(10) Patent No.: US 12,754,429 B2
(45) Date of Patent: Oct. 6, 2026

(54) PROJECTION SYSTEM WITH COLLIMATING SCANNING MIRROR

(71) Applicant: Magic Leap, Inc., Plantation, FL (US)

(72) Inventors: Charles David Melville, Camano Island, WA (US); Brian T. Schowengerdt, Seattle, WA (US); Mathew D. Watson, Bellevue, WA (US)

(73) Assignee: Magic Leap, Inc., Plantation, FL (US)

( * ) Notice: Subject to any disclaimer, the term of this patent is extended or adjusted under 35 U.S.C. 154(b) by 98 days.

(21) Appl. No.: 18/781,680

(22) Filed: Jul. 23, 2024

(65) Prior Publication Data

US 2024/0377645 A1 Nov. 14, 2024

Related U.S. Application Data

(63) Continuation of application No. 17/211,770, filed on Mar. 24, 2021, now Pat. No. 12,078,804, which is a (Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0006* (2013.01); *G02B 6/001* (2013.01); (Continued)

(58) Field of Classification Search
CPC ............ G02B 27/0172; G02B 27/0101; G02B 2027/0136; G02B 27/017; G02B 6/101; G02B 26/0833; G02B 27/30
See application file for complete search history.

(56) References Cited

U.S. PATENT DOCUMENTS 7,835,065 B2 11/2010 Almoric et al.
8,466,953 B2 * 6/2013 Levola ............... G02B 27/0081 348/51
(Continued)

FOREIGN PATENT DOCUMENTS

CN 1726410 A 1/2006
CN 103649816 A 3/2014
(Continued)

OTHER PUBLICATIONS

U.S. Appl. No. 17/211,770, "Non-Final Office Action", Nov. 3, 2023, 9 pages.
(Continued)

*Primary Examiner* — Ryan D Howard
(74) *Attorney, Agent, or Firm* — KILPATRICK TOWNSEND & STOCKTON LLP

(57) ABSTRACT

A display assembly suitable for use with a virtual or augmented reality headset is described and includes the following: an input coupling grating; a scanning mirror configured to rotate about two or more different axes of rotation; an optical element; and optical fibers, each of which have a light emitting end disposed between the input coupling grating and the scanning mirror and oriented such that light emitted from the light emitting end is refracted through at least a portion of the optical element, reflected off the scanning mirror, refracted back through the optical element and into the input coupling grating. The scanning mirror can be built upon a MEMS type architecture.

19 Claims, 18 Drawing Sheets

Related U.S. Application Data continuation of application No. PCT/US2019/053633, filed on Sep. 27, 2019.

(60) Provisional application No. 62/738,722, filed on Sep. 28, 2018.

(51) Int. Cl.

| | |
|---|---|
| ***G02B 26/08*** | (2006.01) |
| ***G02B 26/10*** | (2006.01) |
| ***G02B 27/30*** | (2006.01) |

(52) U.S. Cl.

CPC ....... *G02B 26/0833* (2013.01); *G02B 26/101* (2013.01); *G02B 27/30* (2013.01)

(56) References Cited

U.S. PATENT DOCUMENTS

| | | | | |
|---|---|---|---|---|
| 9,798,149 | B1 * | 10/2017 | Saracco | H01S 5/0683 |
| 12,078,804 | B2 | 9/2024 | Melville et al. | |
| 2005/0041000 | A1 * | 2/2005 | Plut | G03B 21/20 345/39 |
| 2010/0079865 | A1 | 4/2010 | Saarikko et al. | |
| 2014/0253992 | A1 | 9/2014 | Freedman et al. | |
| 2015/0062953 | A1 * | 3/2015 | Woelfing | F21S 41/13 362/84 |
| 2016/0131883 | A1 | 5/2016 | Kleppe et al. | |
| 2016/0154243 | A1 | 6/2016 | Aiki | |
| 2018/0017227 | A1 | 1/2018 | Greene et al. | |
| 2018/0120559 | A1 | 5/2018 | Yeoh et al. | |
| 2018/0231771 | A1 | 8/2018 | Schuck, III et al. | |
| 2018/0275396 | A1 | 9/2018 | Schowengerdt et al. | |
| 2019/0189897 | A1 * | 6/2019 | Elata | H10N 30/208 |

FOREIGN PATENT DOCUMENTS

| | | | |
|---|---|---|---|
| CN | 104049448 | A | 9/2014 |
| CN | 105404112 | A | 3/2016 |
| CN | 105467398 | A | 4/2016 |
| CN | 105892058 | A | 8/2016 |
| CN | 108431583 | A | 8/2018 |
| CN | 108535822 | A | 9/2018 |
| CN | 112771437 | A | 5/2021 |
| EP | 3857293 | A1 | 8/2021 |
| JP | 6074122 | U | 5/1985 |
| JP | 05304645 | A | 11/1993 |
| JP | 10260374 | A | 9/1998 |
| JP | 2006243571 | A | 9/2006 |
| JP | 2007219562 | A | 8/2007 |
| JP | 2008083539 | A | 4/2008 |
| JP | 2011025446 | A * | 2/2011 |
| JP | 2012252265 | A | 12/2012 |
| JP | 2015179245 | A | 10/2015 |
| TW | 200914872 | A | 4/2009 |
| WO | 2010034885 | A1 | 4/2010 |
| WO | 2015001839 | A1 | 1/2015 |
| WO | 2020069426 | A1 | 4/2020 |

OTHER PUBLICATIONS

U.S. Appl. No. 17/211,770, "Notice of Allowance", May 14, 2023, 8 pages.

CN201980063350.3, "Office Action", May 15, 2023, 12 pages. [no translation available].

CN201980063350.3, "Office Action", Nov. 3, 2022, 13 pages. [no translation available].

EP19865291.9, "Extended European Search Report", Nov. 2, 2021, 7 pages.

EP19865291.9, "Intention to Grant", Nov. 23, 2023, 9 pages.

EP24169475.1, "Extended European Search Report", Aug. 6, 2024, 8 pages.

JP2021-517038, "Notice of Allowance", Sep. 26, 2023, 3 pages. [no translation available].

JP2021-517038, "Office Action", Jun. 27, 2023, 2 pages. [no translation available].

PCT/US2019/053633, "International Preliminary Report on Patentability", Apr. 8, 2021, 8 pages.

PCT/US2019/053633, "International Search Report and Written Opinion", Dec. 6, 2019, 9 pages.

JP2023-183896, "Notice of Allowance", Oct. 22, 2024, 3 pages. [no translation available].

EP24169475.1, "Office Action", Feb. 18, 2026, 5 pages.

* cited by examiner

PROJECTION SYSTEM WITH COLLIMATING SCANNING MIRROR

CROSS-REFERENCES TO RELATED APPLICATIONS

This application is a continuation of U.S. patent application Ser. No. 17/211,770, filed on Mar. 24, 2021, U.S. Pat. No. 12,078,804, issued on Sep. 3, 2024, entitled "PROJECTION SYSTEM WITH COLLIMATING SCANNING MIRROR," which is a continuation of International Patent Application No. PCT/US2019/053633, filed on Sep. 27, 2019, entitled "PROJECTION SYSTEM WITH COLLIMATING SCANNING MIRROR," which claims the benefit of priority to U.S. Provisional Patent Application No. 62/738,722, filed Sep. 28, 2018, entitled "PROJECTION SYSTEM WITH COLLIMATING SCANNING MIRROR." The contents of these applications are hereby incorporated by reference in their entirety for all purposes.

BACKGROUND OF THE INVENTION

Modern computing and display technologies have facilitated the development of systems for virtual or augmented reality experiences, where digitally reproduced images or portions thereof are presented to a viewer in a manner wherein they seem to be, or may be perceived as real. A virtual reality, or "VR," scenario typically involves presentation of digital or virtual image information without transparency to other actual real-world visual input; an augmented reality, or "AR" scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

This disclosure describes various embodiments that relate to display assemblies for wearable augmented reality devices. In particular, highly miniaturized display assemblies are described that are substantially smaller than display assemblies that include 2D focal plane array light modulators generated by liquid crystal on silicon or digital micromirror device technology.

A display assembly is disclosed and includes the following: an input coupling grating; a scanning mirror configured to rotate about two or more different axes of rotation; an optical element; and a plurality of optical fibers, each optical fiber of the plurality of optical fibers having a light emitting end disposed between the input coupling grating and the scanning mirror and oriented such that light emitted from the light emitting end is refracted through at least a portion of the optical element, reflected off the scanning mirror, refracted back through the optical element and into the input coupling grating.

Another display assembly is disclosed and includes the following: an input coupling grating; a scanning mirror; an optical element; and an optical fiber having a light emitting end disposed between the input coupling grating and the scanning mirror, the light emitting end oriented such that light emitted from the light emitting end is refracted through at least a portion of the optical element, reflected off the scanning mirror and refracted back through the optical element and into the input coupling grating.

An augmented reality device is disclosed and includes the following: an optically transparent eyepiece configured to project light into a user's eye, the eyepiece comprising an input coupling grating configured to receive light; a scanning mirror configured to rotate about two or more different axes of rotation; an optical element; and a plurality of optical fibers, each optical fiber of the plurality of optical fibers having a light emitting end disposed between the input coupling grating and the scanning mirror and oriented such that light emitted from the light emitting end is refracted through at least a portion of the optical element, reflected off the scanning mirror, refracted back through the optical element and into the input coupling grating.

An optical scanning assembly is disclosed and includes the following: a scanning mirror; and a monocrystalline substrate. The monocrystalline substrate includes a peripheral region; and a mirror support region coupled to the peripheral region by a first flexure and a second flexure, the mirror support region being configured to rotate relative to the peripheral region about a first axis of rotation defined by the first and second flexures, the mirror support region including a mirror support structure coupled to the scanning mirror. The optical scanning assembly also includes a permanent magnet that emits a first magnetic field and is coupled to the monocrystalline substrate; and an electromagnetic coil disposed on the mirror support region and being configured to emit a second magnetic field that interacts with the first magnetic field to induce rotation of the mirror support region about the first axis of rotation.

Another optical scanning assembly is disclosed and includes the following: a planar substrate including a peripheral region; and a mirror support region coupled to the peripheral region by a first flexure and a second flexure, the mirror support region being configured to rotate relative to the peripheral region about an axis of rotation defined by the first and second flexures. The optical scanning assembly also includes a scanning mirror coupled to a central portion of the mirror support region; a permanent magnet that emits a first magnetic field and is coupled to the planar substrate; and an electromagnetic coil disposed on a peripheral portion of the mirror support region and being configured to emit a second magnetic field that interacts with the first magnetic field to induce rotation of the mirror support region about the axis of rotation.

An augmented reality device is disclosed and includes the following: an optically transparent eyepiece configured to project light into a user's eye, the optically transparent eyepiece comprising an input coupling grating configured to receive light; and an optical scanning assembly coupled to the eyepiece. The optical scanning assembly includes: a planar substrate having a peripheral region; and a mirror support region coupled to the peripheral region by a first flexure and a second flexure, the mirror support region being configured to rotate relative to the peripheral region about an axis of rotation defined by the first and second flexures. The optical scanning assembly also includes a scanning mirror coupled to a central portion of the mirror support region; a permanent magnet that emits a first magnetic field and is coupled to the planar substrate; and an electromagnetic coil disposed on a peripheral portion of the mirror support region and being configured to emit a second magnetic field that interacts with the first magnetic field to induce rotation of the mirror support region about the axis of rotation. The augmented reality device also includes a light emitting component configured to direct light toward the scanning mirror so that the light is reflected off the scanning mirror toward and into the input coupling grating.

A method of operating a display assembly having an input coupling grating, an optical element, and a scanning mirror is disclosed and includes the following: emitting imagewise modulated light from an optical fiber. The method also includes refracting the emitted imagewise modulated light through at least a portion of the optical element to provide an input beam. The method further includes reflecting the input beam off the scanning mirror to provide a scanned beam. The method further includes refracting the scanned beam through the at least a portion of the optical element to provide refracted input light. The method further includes coupling the refracted input light into the input coupling grating.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SELECTED EMBODIMENTS

Figure 1:
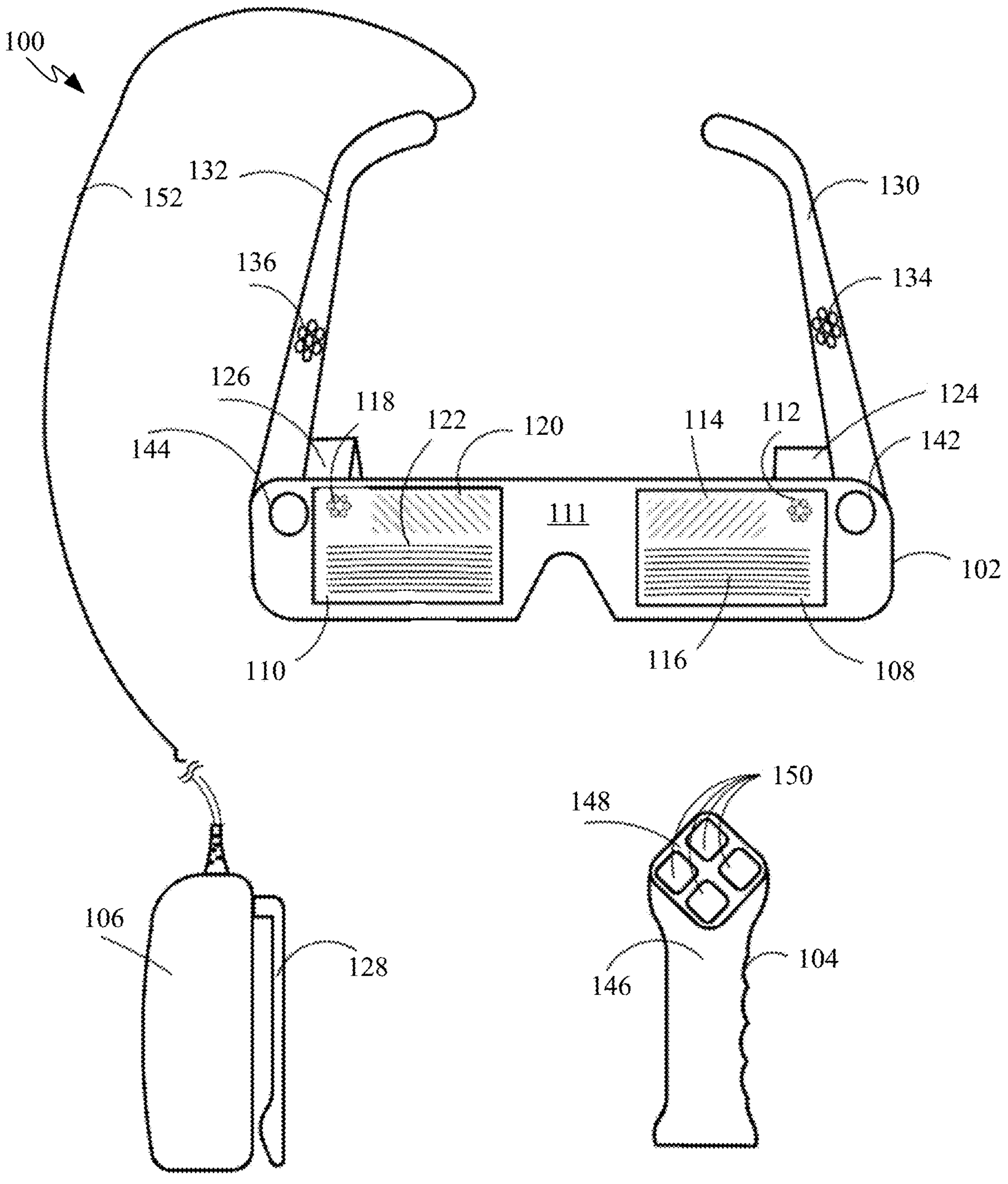
FIG. 1 shows an exemplary augmented reality system according to an embodiment of the present invention.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Image generating components may be important to the performance of virtual and augmented reality devices. Image generating components also tend to take up space and utilize substantial portions of a system's energy. One way to address these two problems is to build the image generating components with microelectromechanical system (MEMS) technology. In particular, this disclosure describes an optical scanner configuration built upon a monocrystalline substrate.

The optical scanner can include a scanning assembly incorporated into the monocrystalline substrate that includes a scanning mirror configured to rotate about two orthogonal axes to perform a raster scan. Rotation about one of the axes can be induced by interaction between an electromagnet positioned upon a mirror support region of the monocrystalline substrate and a persistent magnetic field generated by permanent magnets positioned upon opposing sides of the mirror. Light can be delivered to the scanning mirror by one or more optical fibers that include light emitting ends configured to direct light toward the scanning mirror. In some embodiments, the light emitted by the optical fibers is refracted through an optical element prior to arriving at the scanning mirror. After being reflected by the scanning mirror the light passes back through the optical element prior to being received at an input coupling grating of an augmented reality device. The optical element can help to collimate the light prior to it being received at the input coupling grating.

In some embodiments, a two sided scanning mirror can be utilized and positioned between two optical elements so that the scanning mirror is able to scan light received from and transmitted out in two different directions. In this way, light can be delivered into two different sets of diffractive optics or alternatively, light emitted in one of the directions can be emitted outward to help characterize an environment surrounding a user of the augmented reality device.

These and other embodiments are discussed below with reference to FIGS. 1-7C; however, those skilled in the art will readily appreciate that the detailed description given herein with respect to these figures is for explanatory purposes only and should not be construed as limiting.

FIG. 1 shows an exemplary augmented reality system 100 according to an embodiment of the present invention. As shown in FIG. 1, system 100 includes augmented reality headgear 102, a handheld controller 104, and an auxiliary unit 106. Augmented reality headgear 102 includes a left (user's left) transparent waveguide set eyepiece (herein below "left eyepiece") 108 and a right transparent waveguide set eyepiece (herein below "right eyepiece") 110. Each of eyepieces 108, 110 includes surface diffractive optical elements for controlling the flow of imagewise modulated light. Eyepieces 108 and 110 are held in position by optical frame 111. Left eyepiece 108 includes a left input coupling grating 112, a left orthogonal pupil expansion (OPE) grating 114 and a left exit (output) pupil expansion (EPE) grating 116. Similarly, right eyepiece 110 includes a right input coupling grating 118, a right OPE grating 120 and a right EPE grating 122. Imagewise modulated light is transferred via input coupling gratings 112, 118, OPEs 114, 120 and EPE 116, 122 to a user's eye. Alternatively, in lieu of the input coupling grating 112, 118, OPE grating 114, 120, and EPE grating 116, 122, eyepieces 108, 110 can include refractive and reflective features for controlling the coupling of imagewise modulated light to the user's eyes. Although some elements are referred to herein as gratings, for example, left input coupling grating 112, left OPE grating 114, left EPE grating 116, right input coupling grating 118, right OPE grating 120, and right EPE grating 122, it will be appreciated that the present invention is not limited to gratings as diffractive structures and other diffractive optical elements can be utilized in conjunction with, in addition to, or in place of gratings. However, the references herein to gratings, which are referenced for purposes of clarity, should be understood to encompass other diffractive optical elements. One of ordinary skill in the art would recognize many variations, modifications, and alternatives.

A left source of imagewise modulated light 124 is optically coupled into left eyepiece 108 through left input coupling grating set 112 and a right source of imagewise modulated light 126 is optically coupled into right eyepiece 110 through right input coupling grating 118. Input coupling grating sets 112, 118 deflect light from sources of imagewise modulated light 124, 126 to angles above the critical angle for Total Internal Reflection (TIR) for eyepieces 108, 110. OPE grating sets 114, 120 incrementally deflect light propagating by TIR down toward EPE grating sets 116, 122. EPE grating sets 116, 122 incrementally couple light out toward the user's face including the user's eyes' pupils. Each of eyepieces 108, 110 can include multiple waveguide planes used to handle different color components and are provided with EPE grating sets 116, 122 having different grating line curvatures in order to impart different wavefront curvatures (corresponding to different virtual image distances) to imagewise modulated light.

Auxiliary unit 106 can include a battery to provide energy to operate system 100, and can include a processor for executing programs to operate system 100. In some embodiments, the processor or another auxiliary processor can take the form of a controller that is configured to perform one or more feedback control operations to help maintain control of display assemblies of electronic device 100. As shown, auxiliary unit 106 includes a clip 128 that is useful for attaching auxiliary unit 106 to a user's belt. Alternatively, auxiliary unit 106 can have a different form factor.

Augmented reality headgear 102 also includes a left temple arm 130 and a right temple arm 132. Left temple arm 130 includes a left temple speaker port 134 and right temple arm 132 includes a right temple speaker port 136. Handheld controller 104 includes a grip portion 146 and a top 148 that includes a plurality of buttons 150. Auxiliary unit 106 is coupled to headgear 102 through a cable 152, which can, for example, include electrical wires and fiber optics. Wireless connections between auxiliary unit 106 and headgear 102 can also be used.

Figure 2:
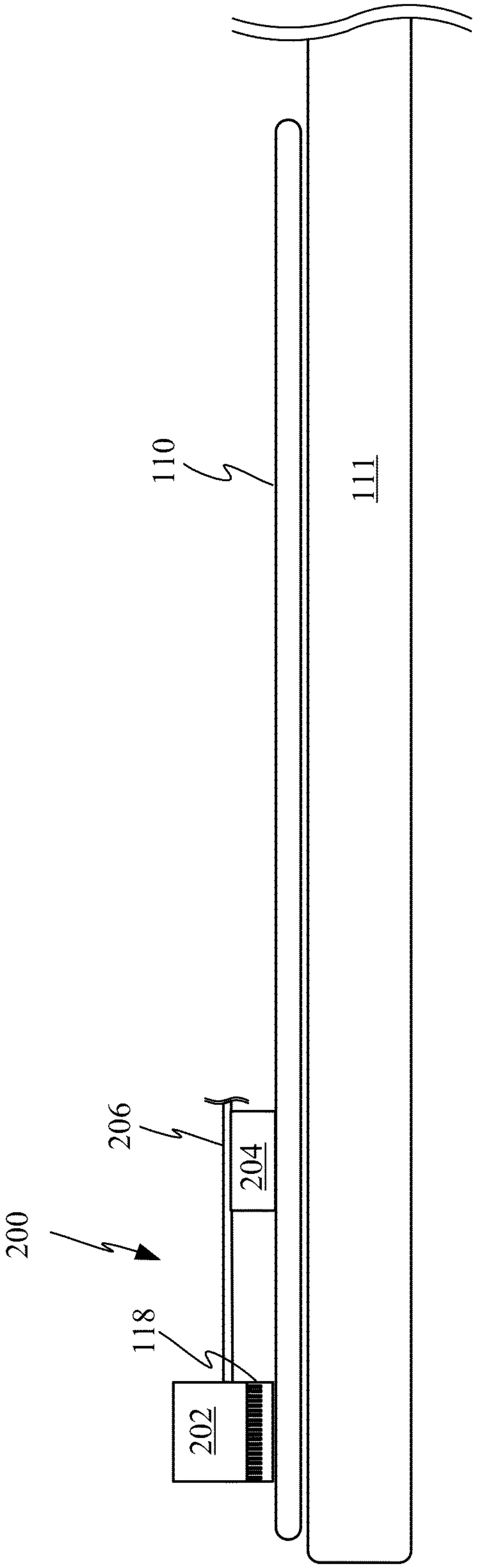
FIG. 2 shows a top view of an exemplary configuration that includes an optical assembly according to an embodiment of the present invention.

FIG. 2 shows a top view revealing an exemplary configuration that includes an optical assembly 200 according to an embodiment of the present invention. Optical assembly 200 includes optical scanner 202 affixed to a rear-facing surface of eyepiece 110. By orientating optical scanner 202 in this manner, an overall thickness of an optical stack can be reduced. Optical scanner 202 is depicted being affixed to eyepiece 110 by mechanical support structure 204. In some embodiments, mechanical support structure 204 can instead be affixed to optical frame 111 to avoid adverse interaction between mechanical support structure 204 and eyepiece 110. In some embodiments, an optically reflective material can be affixed between mechanical support structure 204 and eyepiece 110 in order to reduce the occurrence of light being prematurely decoupled from eyepiece 110. Light can be delivered to optical scanner 202 by one or more optical fibers 206. Light from optical fibers 206 can be directed toward eyepiece 110 by optics within optical scanner 202 in a predefined scan pattern. The predefined pattern is then received and transmitted to eyepiece 110 by input coupling grating 118.

Figure 3A:
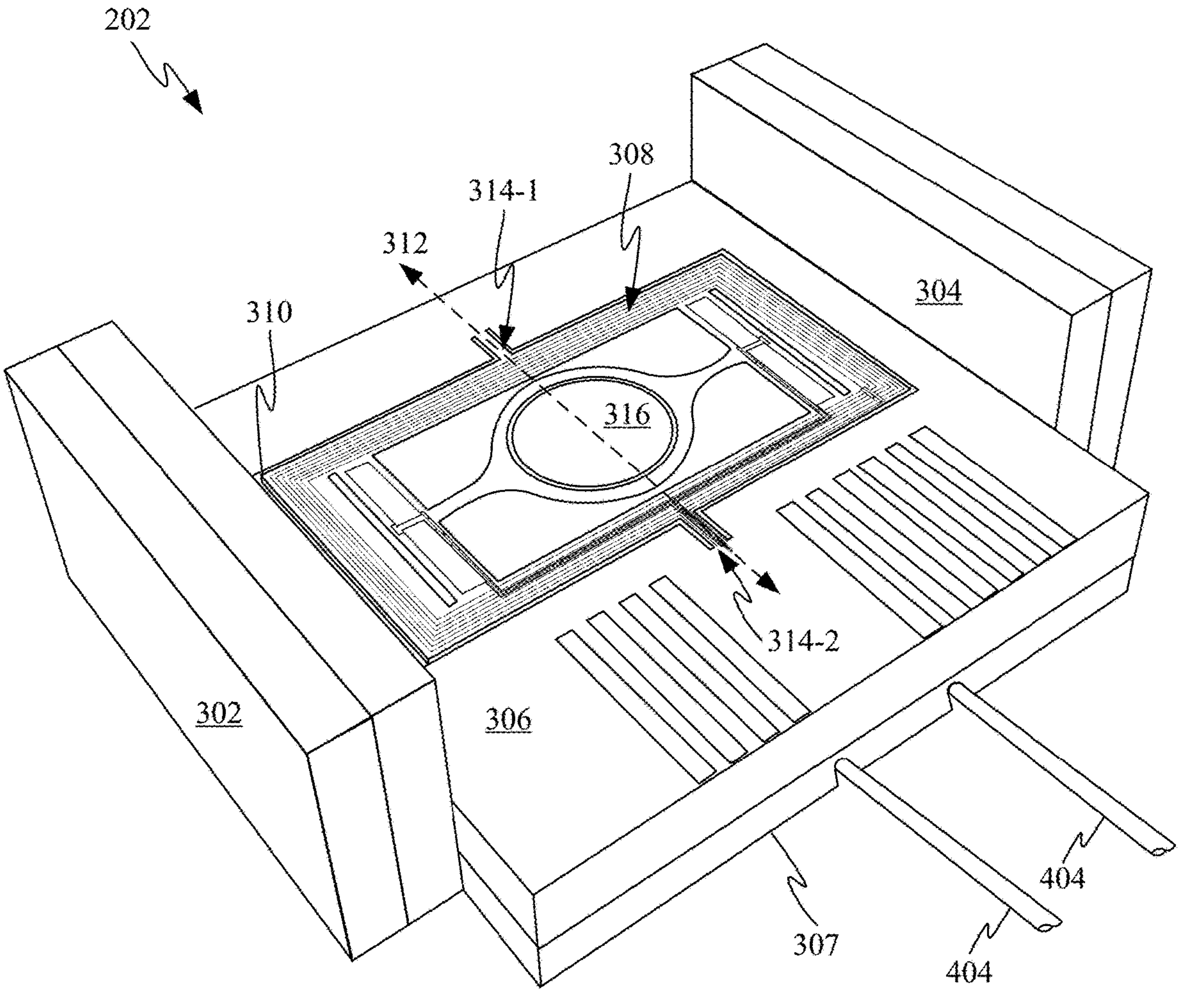
FIG. 3A shows a perspective view of an optical scanner suitable for use as the optical assembly depicted in FIG. 2.

FIG. 3A shows a perspective view of optical scanner 202. Optical scanner 202 includes permanent magnets 302 and 304 that are positioned upon opposing sides of a monocrystalline substrate 306. A support layer 307 can be positioned directly beneath monocrystalline substrate 306. Permanent magnets 304 and 306 emit persistent magnetic fields oriented in the same direction that establish a magnetic field across at least a portion of monocrystalline substrate 306. The magnetic field is configured to interact with a shifting magnetic field emitted by an electromagnetic coil 308 positioned upon monocrystalline substrate 306. Interaction between the magnetic field and the shifting magnetic field induce rotation of a mirror support region 310 about axis of rotation 312, which is attached to a peripheral region of monocrystalline substrate 306 by flexures 314-1 and 314-2. In this way, a scanning mirror 316 coupled to mirror support region 310 can rotate about axis of rotation 312. In some embodiments, axis of rotation 312 can be referred to as a slow axis of rotation. It should be noted that optical fibers 404, which are configured to supply light to optical scanner 202, are also depicted and extend through channels defined by support layer 307. Additional views and details regarding optical fibers 404 can be found in the description accompanying FIG. 4A.

Figure 3B:
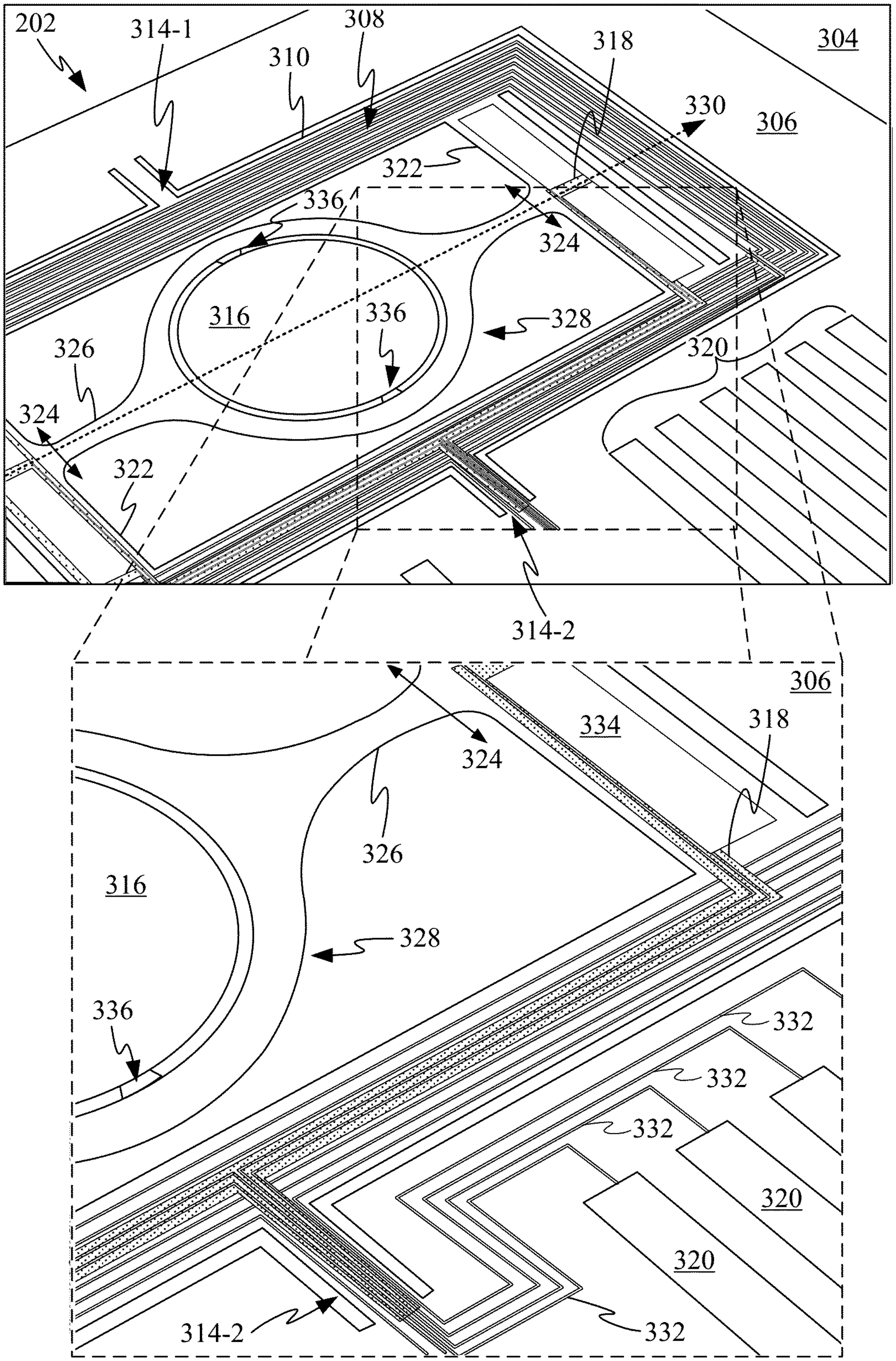
FIG. 3B shows a perspective view of a portion of an optical scanner according to an embodiment of the present invention.

FIG. 3B shows a perspective view of a portion of optical scanner 202 showing mirror support region 310, which is attached to monocrystalline substrate 306. In particular, piezoelectric film 318 is shown extending across flexure 314-2. In this way, portions of piezoelectric film 318 disposed upon mirror support region 310 can be electrically coupled to one or more of electrical contacts 320. Piezoelectric film 318 extends across mirror support region 310 as depicted. By sending pulses of electricity to piezoelectric film 318, an S-shaped geometry of piezoelectric film 318 applies a force 324 to strips 322 of monocrystalline material that extends across opposing sides of a central opening defined by mirror support region 310. Application of forces 324 to strips 322 of monocrystalline material induces deflection of strips 322 of monocrystalline material. The deflection of strips 322 transfers at least a portion of forces 324 to arms 326 of mirror support structure 328, which in turn transmit at least a portion of forces 324 to scanning mirror 316.

When a frequency at which forces 324 are applied match a natural frequency of mirror support structure 328, rotation of scanning mirror 316 at the natural frequency about a second axis of rotation 330 can be induced. In general, a frequency of rotation about the second axis can be substantially higher than a frequency of rotation about first axis of rotation 312, thereby allowing scanning mirror 316 to direct light received at scanning mirror 316 in a raster scan pattern. In some embodiments, second axis of rotation 330 can be referred to as a fast axis of rotation since it will generally have a substantially higher frequency than the slow axis of rotation to achieve a raster scan type scan pattern.

FIG. 3B also shows a close up view illustrating how electrically conductive pathways 332 can extend across and atop piezoelectric film 318. Piezoelectric film 318 electrically insulates electrically conductive pathways 332 from electrically conductive pathways making up electromagnetic coil 308. Electrically conductive pathways 332 can be coupled with sensor regions 334, which can be configured to sense forces 324 being applied to strips 322 of monocrystalline material in order to track rotation of mirror support structure 328 about axis of rotation 330. The motion tracking provided by sensor regions 334 can allow feedback control of inputs allowing modulation of the signals sent to piezoelectric film 318 to achieve a desired rate of rotation about axis of rotation 330. FIG. 3B also shows how scanning mirror 316 can be attached to opposing sides of mirror support structure 328 at attachment points 336. While only two attachment points 336 are shown it should be appreciated that a larger number of attachment points can be used to keep rotation of scanning mirror 316 stable and in control.

Figure 3C:
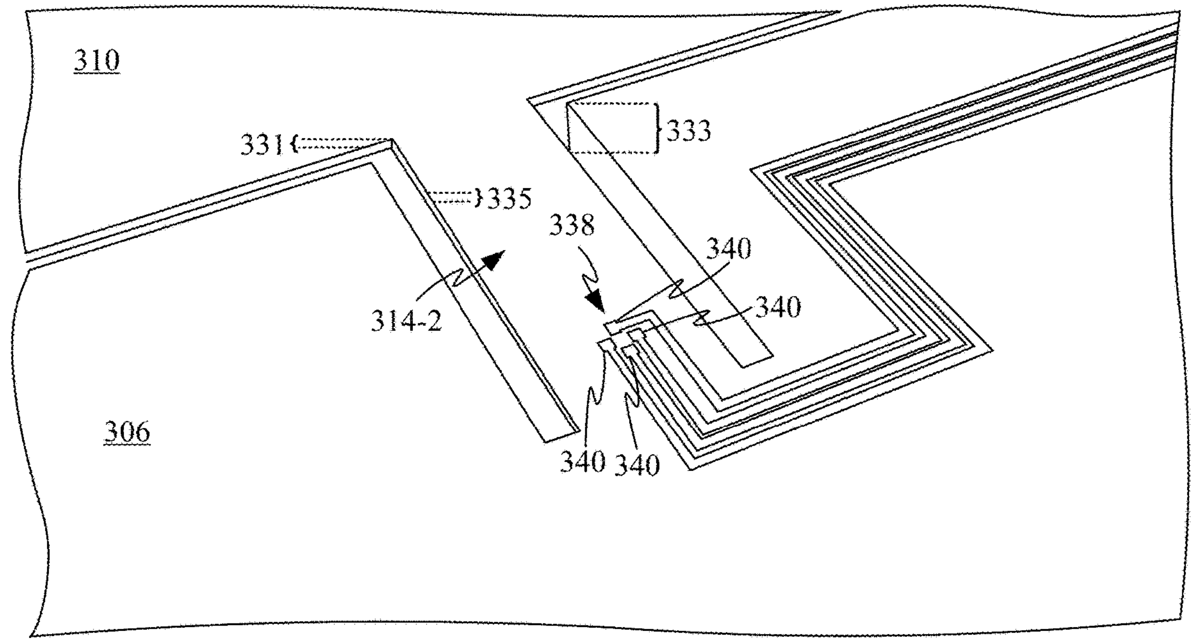
FIG. 3C shows a close up view of a portion of a flexure of a mirror support region of the optical scanner illustrated in FIG. 3B.

FIG. 3C shows a close up view of a portion of flexure 314-2 with many of the electrically conductive pathways and piezoelectric film removed to show how flexure 314-2 could support a Wheatstone or balance bridge sensor assembly 338. Balance bridge sensor assembly 338 can include four different sensors 340 that take the form of strain gauges or piezoelectric resistors. Differential readings of sensors 340 can be used to accurately measure an amount of twist undergone by flexure 314-2. By measuring the amount of twist of flexure 314-2, an accurate measurement of rotation of mirror support region 310 about axis of rotation 312 can be measured.

FIG. 3C also shows how a thickness of mirror support region 310 can differ from a thickness of portions of monocrystalline substrate 306. In the illustrated embodiment, flexure 314-2 has a thickness 335 and mirror support region 310 has a thickness 331, which is less than a thickness 333 of monocrystalline substrate 306. While thickness 335 of flexure 314-1 is shown in FIG. 3C as being equal to thickness 331 of mirror support region 310, in various embodiments, thickness 335 may be less than thickness 331, equal to thickness 331, or greater than thickness 331. In this way, thickness 331 of mirror support region 310 and the thickness of flexure 314-1 and 314-2 can be set to achieve a desired resistance allowing for a desired rate and magnitude of rotation to be achieved about axis of rotation 312. It should be noted that in some embodiments, thickness 331 of mirror support region 310 can be the same or larger than thickness 333 of monocrystalline substrate 306.

Figure 3D:
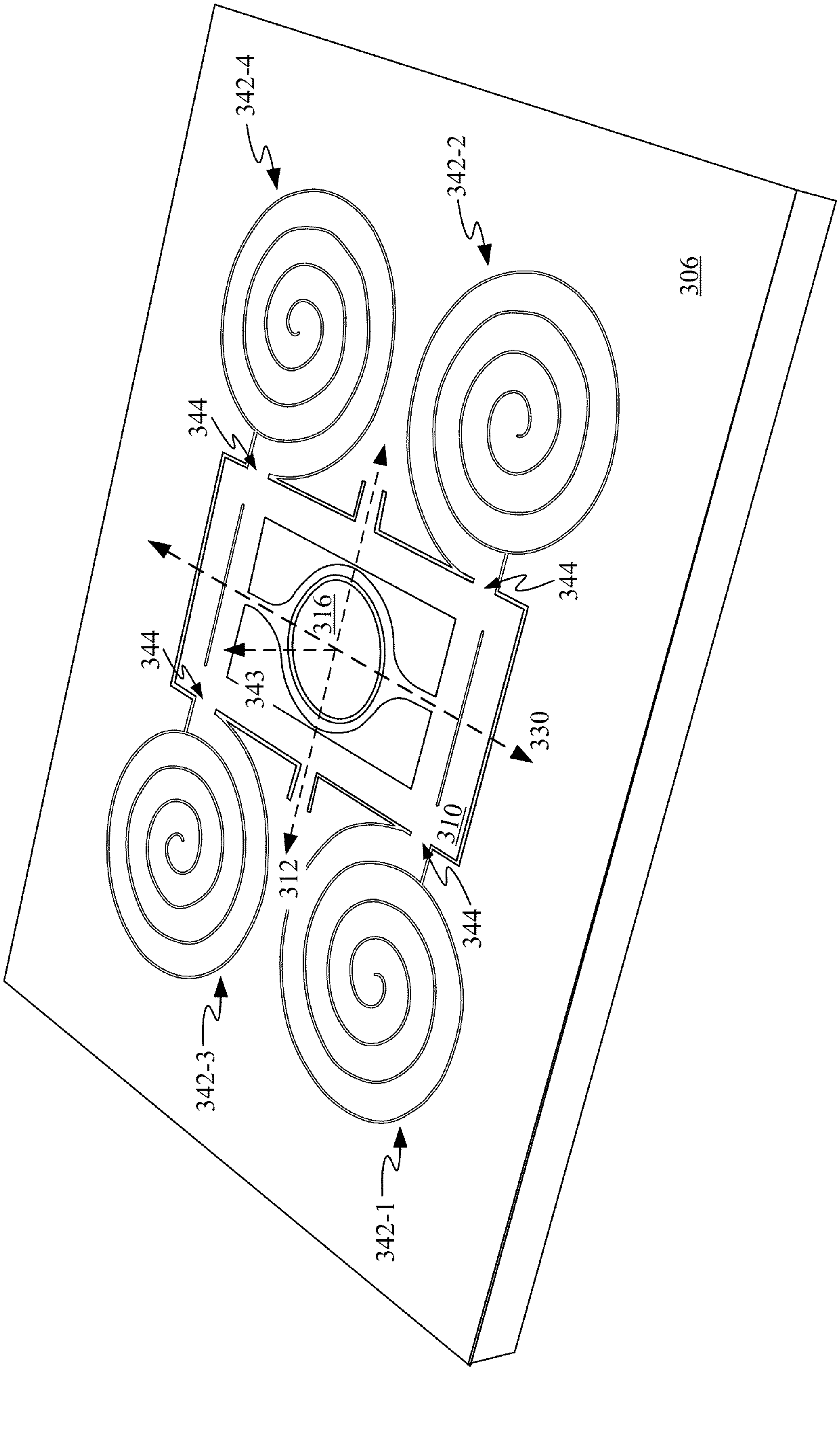
FIG. 3D shows an alternative configuration of the optical scanner depicted in FIG. 3A in which rotation of a mirror support region is driven by piezoelectric actuators according to an embodiment of the present invention.

FIG. 3D shows an alternative configuration of optical scanner 202 in which rotation of mirror support region 310 about axis of rotation 312 is driven by piezoelectric actuators 342 in lieu of the electromagnetic actuator shown in FIG. 3A. Each of piezoelectric actuators 342 can have a spiral geometry configured to telescope up and down relative to mirror support region 310 (i.e., along an axis 343 orthogonal to mirror support region 310 and orthogonal to axes of rotation 312 and 330) in response to electrical energy being channeled through a layer of piezoelectric film arranged upon each of piezoelectric actuators 342. When the electrical energy is channeled through the piezoelectric film of piezoelectric actuators 342, the resulting contraction and expansion of the piezoelectric film induces the telescoping of piezoelectric actuators 342 to accommodate the expansion and contraction. This telescoping action imparts vertical forces (i.e., along axis 343) upon mirror support region 310 at interfaces 344. It should be noted that while a circular spiral geometry is depicted for piezoelectric actuators 342, it should be appreciated that square, rectangular, oval or other suitable spiral geometries are also possible. Thus, in an embodiment, piezoelectric actuators 342 provide for raising and lowering of interfaces 344 with respect to a center of piezoelectric actuator 342 that is fixed to substrate 306.

A controller associated with this configuration of optical scanner 202 can be configured to synchronize the transmission of concurrent pulses of electrical energy to piezoelectric actuators 342-1 and 342-2 and also synchronize transmission of concurrent pulses of electrical energy to piezoelectric actuators 342-3 and 342-4. A rate and strength of the concurrent pulses of electrical energy sent to the pairs of piezoelectric actuators 342 can dictate a rate and magnitude of the rotation of mirror support structure 310 about axis of rotation 312. In some embodiments, the controller could also be configured to establish a slight offset between actuations of the pairs of piezoelectric actuators 342. In this way, in addition to inducing rotation about axis of rotation 312, piezoelectric actuators 342 could also at least partially induce rotation of scanning mirror 316 about axis of rotation 330. As rotation of scanning mirror 316 about axis of rotation 330 is set to be at a natural frequency, this offset actuation of piezoelectric actuators 342 could be enough to sustain rotation about axis of rotation 330 once established at the natural frequency.

Figure 3E:
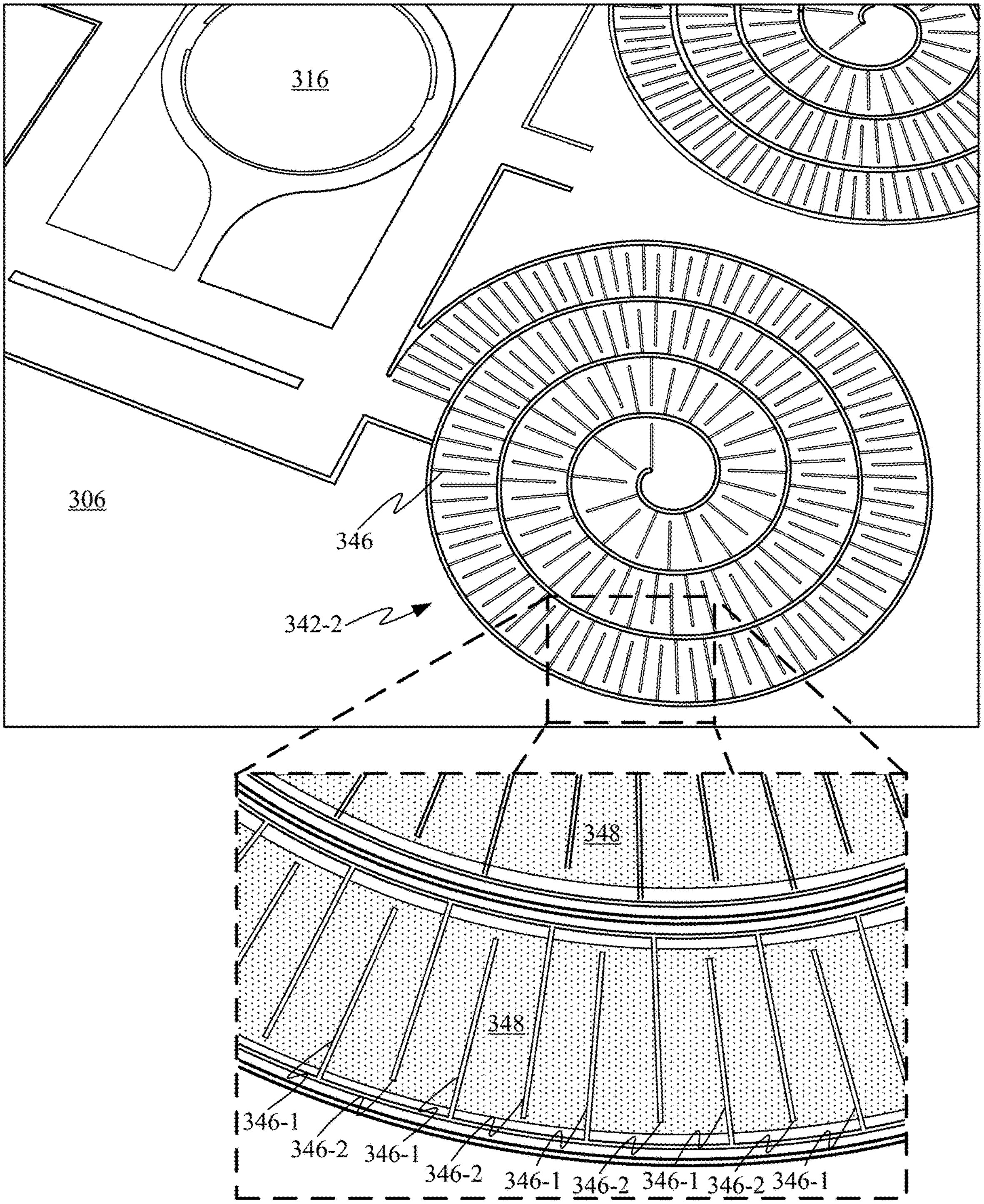
FIG. 3E shows a close up view of one of the piezoelectric actuators depicted in FIG. 3D in order to illustrate one possible arrangement of electrodes upon the piezoelectric actuator.

FIG. 3E shows a close up view of piezoelectric actuator 342-2 in order to illustrate one possible arrangement of electrodes upon piezoelectric actuator 342-2. In particular, electrodes 346 are shown being arranged in an interdigitated configuration. The close up view of a portion of a loop of piezoelectric actuator 342-2 shows how electrodes 346-1 protrude from a first side of the loop and electrodes 346-2 protrude from a second side of the loop. Although electrical energy could be applied to either side, for exemplary purposes electrodes 346-1 will receive the electric current and electrodes 346-2 will act as a ground. Current input through electrodes 346-1 passes through piezoelectric film 348 as an electric field to reach an adjacent one of electrodes 346-2, allowing the electric field to be absorbed and resulting current to go to ground. When the electric potential is applied to the interdigitated electrode array in this manner, piezoelectric film 348 oscillates creating transverse waves of a known velocity to travel through piezoelectric film 348 resulting in a telescoping motion of piezoelectric actuator 342-2. This interdigitated configuration provides a larger amount of output when compared with more conventional electrode configurations. However, other electrode configurations are also possible and deemed to be within the scope of this disclosure.

Figure 3F:
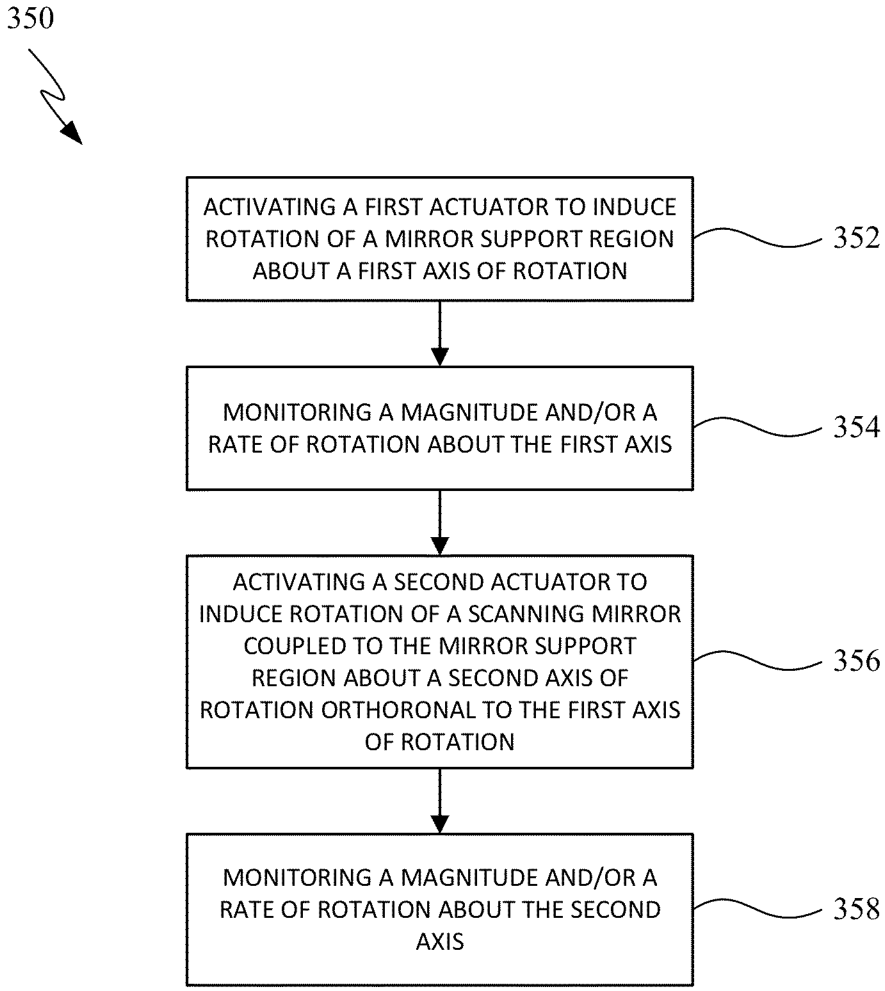
FIG. 3F shows a block diagram describing a method for operating an optical scanner according to an embodiment of the present invention.

FIG. 3F shows a block diagram 350 illustrating a method for operating an optical scanner. At 352, a first actuator is activated to induce rotation of a mirror support region about a first axis of rotation. The first actuator can take many forms. For example, the first actuator can take the form of a permanent magnet and electromagnetic coil mounted on the mirror support region. In this configuration, the electromagnetic coil wraps around a periphery of the mirror support region and is configured to emit a shifting magnetic field or flux that induces rotation of the mirror support region by interacting with a magnetic field emitted by one or more permanent magnets of the optical scanner. Alternatively, the first actuator can take the form of multiple piezoelectric actuators positioned at opposing ends of the mirror support region. The piezoelectric actuators can each have a spiral geometry defined by the same monocrystalline substrate used to form the mirror support region. In this configuration, the material forming the spiral geometry is integrally formed with the material forming the mirror support region allowing for a robust mechanical coupling between the piezoelectric actuators and the mirror support region. Piezoelectric film can overlay each of the piezoelectric actuators such that when an electrical impulse is applied to the piezoelectric actuator by electrodes spaced along the loops making up the spiral geometry, a transverse wave is induced at a desired speed and magnitude to induce telescoping of the concentric loops making up the spiral geometry of the piezoelectric actuators.

At 354, a magnitude and/or a rate at which the mirror support region rotates about the first axis of rotation can be monitored. In some embodiments, the monitoring can be performed by a first sensor assembly positioned similarly to sensor assembly 338 as depicted in FIG. 3C. For example, the first sensor assembly may be positioned at one or both of flexes 314-1 and 314-2, which are described in FIGS. 3A-3C. Alternatively, the first sensor assembly may be positioned at one or more of interfaces 344, which are described in FIGS. 3D and 3E. By monitoring sensors configured to measure strain within a flex or interface about which the mirror support region is configured to rotate, the first sensor assembly can determine the magnitude and/or rate of rotation of the mirror support region about the first axis of rotation.

In some embodiments, the first sensor assembly can be made up of only a single strain sensor while in other embodiments an array of the strain measuring sensors can be included in the first sensor assembly. The strain sensors can take many forms including strain gauges and piezoelectric resistors. Readings from these strain sensors can be utilized to perform feedback control in order to assure a desired rate and magnitude of rotation about the first axis of rotation. Examples of the magnitude of rotation measured at 354 may include a positive magnitude or a negative magnitude. Examples of the rate of rotation measured at 354 may include a rate of rotation expressed in cycles per second (cps), radians per second (rad/s), revolutions per minute (rpm), and the like.

At 356, a second actuator can be activated to induce rotation of a scanning mirror held and supported by the mirror support region about a second axis of rotation. The second axis of rotation may be orthogonal to the first axis of rotation. For example, the first axis of rotation may be axis of rotation 312 and the second axis of rotation may be axis of rotation 330. In some embodiments, the second actuator can be a piezoelectric actuator that takes the form of a layer of piezoelectric material that extends across a portion of the mirror support region. The rate of rotation induced can correspond to a natural or resonant frequency of the scanning mirror and a portion of the mirror support region supporting the scanning mirror. In some embodiments, the first and second actuators can be initiated concurrently while in other embodiments, the first or second actuators can be actuated sequentially. For example, it could be beneficial to initiate the second actuator first so that rotation of the scanning mirror at the natural or resonant frequency can be achieved prior to initiating rotation about the first axis of rotation.

At 358, a second sensor assembly positioned upon the portions of the mirror support region supporting the scanning mirror can be utilized to measure the rate and/or the magnitude of rotation of the scanning mirror. These sensor readings can be used to maintain the rotation within desired threshold values by varying inputs made to the second actuator. In some embodiments, the controller can be configured to consider sensor feedback from both the first and second sensor assemblies. This sensor feedback can also be utilized to adjust light inputs in order to ameliorate any problems with display output due to unwanted variations in rotation of the scanning mirror. Examples of the magnitude of rotation measured at 358 may include a positive magnitude or a negative magnitude. Examples of the rate of rotation measured at 358 may include a rate of rotation expressed in cycles per second (cps), radians per second (rad/s), revolutions per minute (rpm), and the like.

It should be appreciated that the specific steps illustrated in FIG. 3F provide a particular method for operating an optical scanner according to an embodiment of the present invention. Other sequences of steps may also be performed according to alternative embodiments. For example, alternative embodiments of the present invention may perform the steps outlined above in a different order. Moreover, the individual steps illustrated in FIG. 3F may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4A:
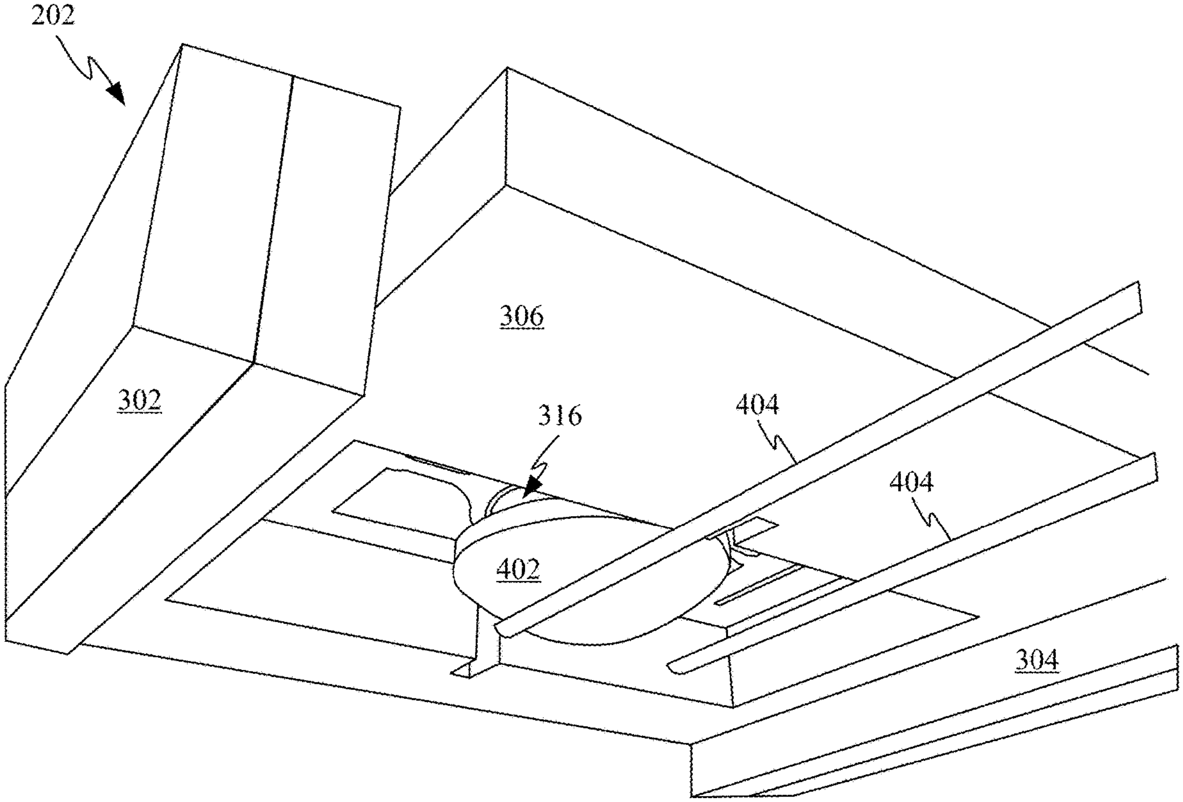
FIG. 4A shows a perspective view of a downward facing side of the optical scanner depicted in FIGS. 3A-3C.

FIG. 4A shows a perspective view of a downward facing side of optical scanner 202. Support layer 307 is omitted from FIG. 4A so as to show a downward facing surface of monocrystalline substrate 306. FIG. 4A further shows how optical element 402 can be positioned immediately beneath scanning mirror 316. Optical element 402 can have a convex shape and be configured to redirect light received from optical fibers 404 toward scanning mirror 316 and then collimate light reflected off scanning mirror 316 prior to it being received at input coupling grating 118. While optical element is depicted having a particular shape it should be appreciated that other optical configurations are possible.

For example, some configurations could include two or more optical elements. Further, the optical element or elements could be formed from many different materials, such as for example, glass, polymer and the like.

In some embodiments, monocrystalline substrate 306 can define a cavity for accommodating optical element 402 and optical fibers 404. In some embodiments, support layer 307, which was omitted from FIG. 4A for purposes of clarity, can include an opening that allows support layer 307 to maintain optical element 402 in the depicted position without unduly obscuring the passage of light through optical element 402. Support layer 307 may also be positioned substantially parallel to monocrystalline substrate 306 and may include cavities accommodating optical fibers 404, similar to that depicted in FIG. 3A.

Figure 4B:
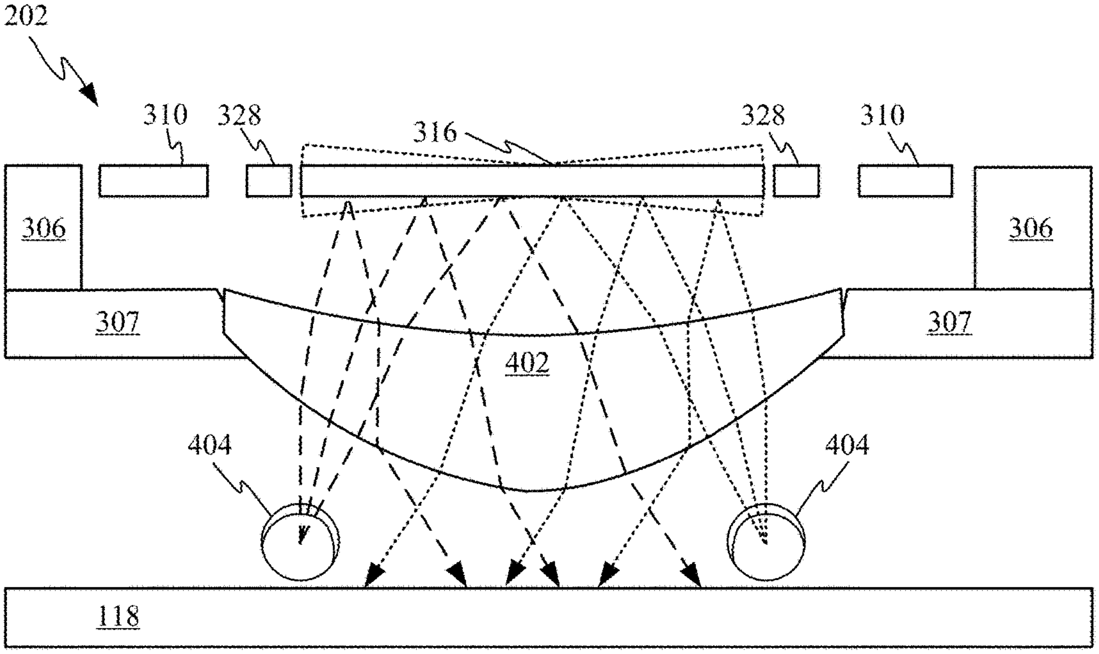
FIG. 4B shows a cross-sectional view of the optical scanner depicted in FIGS. 3A-3C.

FIG. 4B shows a cross-sectional view of optical scanner 202 and input coupling grating 118 with light rays being emitted from optical fibers 404. The emitted light passes through optical element 402 and is redirected toward scanning mirror 316. After reflecting off scanning mirror 316, the light passes again through optical element 402 and is redirected toward input coupling grating 118. Scanning mirror 316 is attached at opposite ends to mirror support structure 328, which is surrounded by mirror support region 310. Rotation of mirror support region 310 can cause the rotation of scanning mirror 316 about a first axis of rotation (e.g., axis of rotation 312), and rotation of mirror support structure 328 can cause the rotation of scanning mirror 316 about a second axes of rotation (e.g., axis of rotation 330).

It should be appreciated that while FIG. 4B shows scanning mirror 316 in a neutral position, when scanning mirror 316 is rotated about one or both of axes of rotation 312 and 330, the light emitted by optical fibers 404 can be shifted to cover an area of input coupling grating 118 configured to couple light into a diffractive eyepiece. It should be noted that at some angles optical fibers 404 may obscure a portion of input coupling grating 118. However, a thickness of optical fibers 404 can be such that any obscuration of the light causes little to no degradation of a resulting image projected upon input coupling grating 118. It should be noted that while only two optical fibers 404 are depicted, additional optical fibers can be used in various implementations. For example, three or four optical fibers could be included to increase light output and/or to increase a refresh rate, illumination level, and/or spatial resolution of imagery produced by optical scanner 202.

Figure 4C:
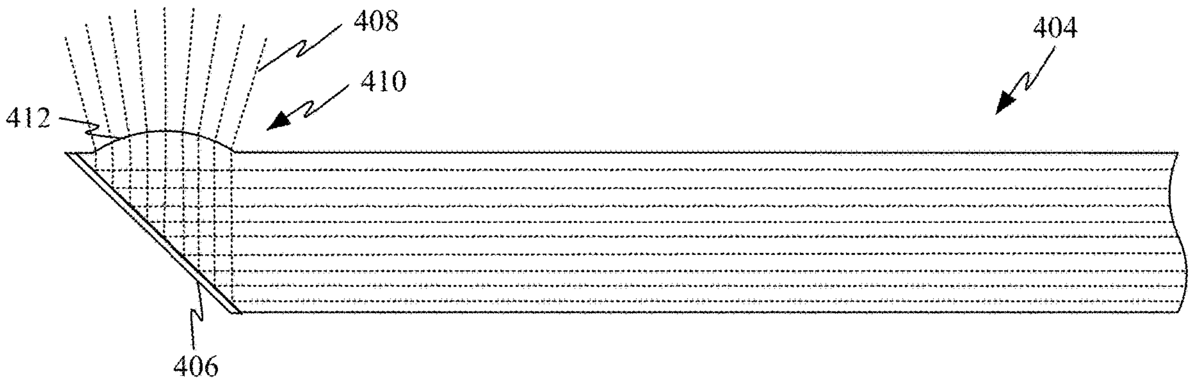
FIG. 4C shows a cross-sectional side view of an exemplary one of the optical fibers depicted in FIGS. 4A-4B.

FIG. 4C shows a cross-sectional side view of an exemplary optical fiber 404. Optical fiber 404 can be formed by slicing off a portion of a distal end of optical fiber 404 to form a 45-degree angle. The sliced distal end can subsequently be polished to form a mirrored surface 406 across the distal end. In this way, light 408 can be decoupled from a light emitting end 410 of optical fiber 404. When light 408 is reflected off mirrored surface 406, it turns at a 90-degree angle with respect to a longitudinal axis of optical fiber 404. FIG. 4C also shows how an area of optical fiber 404 adjacent to mirrored surface 406 can include a convex protrusion 412 suitable for spreading light as light 408 is decoupled from light emitting end 410 of optical fiber 404. A light receiving end of optical fiber 404 opposite light emitting end 410 can be optically coupled to a light-emitting diode (LED), laser, or other light generating component. A color of the light emitted by the light generating component can vary in accordance with a desired shape, size and color of imagery being displayed by an associated display device.

Figure 5A:
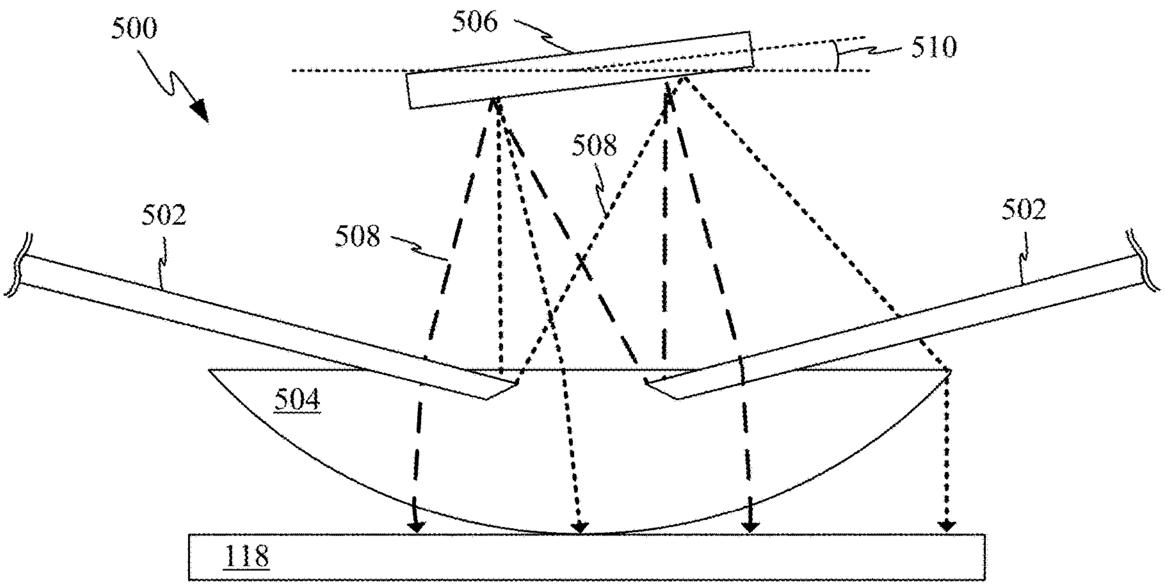
FIG. 5A shows a cross-sectional view of elements of an optical scanner in a first configuration according to an embodiment of the present invention.
Figure 5B:
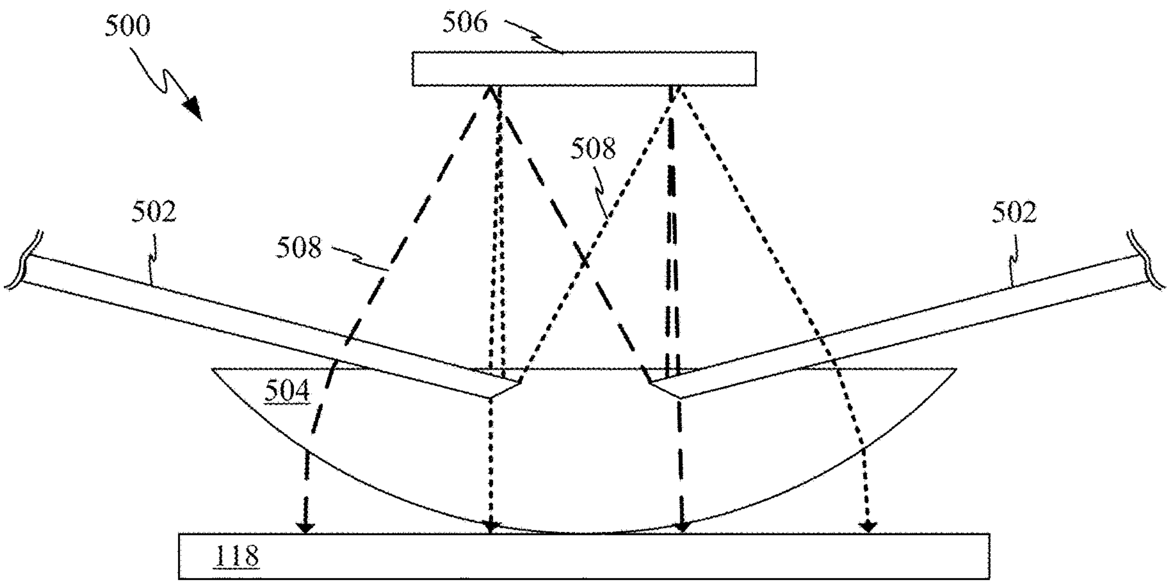
FIG. 5B shows a cross-sectional view of the optical scanner illustrated in FIG. 5A in a second configuration according to an embodiment of the present invention.
Figure 5C:
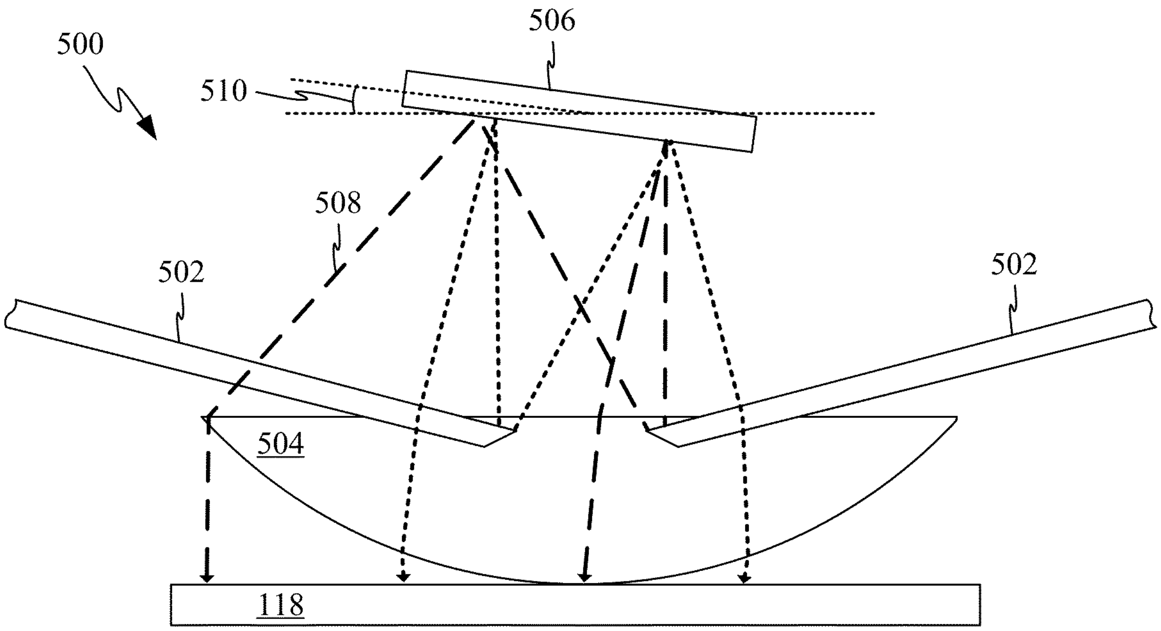
FIG. 5C shows a cross-sectional view of the optical scanner illustrated in FIG. 5A in third configuration according to an embodiment of the present invention.

FIGS. 5A-5C illustrate an alternative embodiment of an optical scanner 500 in which light is emitted by multiple optical fibers 502 having a light emitting end positioned between an optical element 504 and a scanning mirror 506. In some embodiments, a light emitting end of optical fibers 502 can be at least partially embedded within optical element 504, allowing for optical fibers 502 to be positioned at desired angle and position relative to scanning mirror 506. In other embodiments, optical fibers 502 can lay along an upper concave curvature of optical element 504.

FIG. 5A shows a cross-sectional view of optical scanner 500, demonstrating how a reflective surface of scanning mirror 506 can rotate toward the right about axis of rotation 312 or 330 by a scanning angle 510 to shift light emitted by optical fibers 502 to a right side of optical element 504. In some embodiments, scanning angle 510 can be about 7.5 degrees; however, scanning angle 510 can be larger or smaller since scanning angle 510 is generally commensurate with a size of optical element 504. Optical element 504 can be sized in accordance with a size of input coupling grating 118.

FIG. 5B shows a cross-sectional view of optical scanner 500, demonstrating how when scanning mirror 506 is oriented directly toward input coupling grating 118, optical element 504 refracts light 508 reflected off scanning mirror 506 toward a central region of input coupling grating 118. In some embodiments, the region of input coupling grating 118 that receives light when scanning mirror 506 is oriented directly toward input coupling grating 118 (as depicted in FIG. 5B) may partially or substantially overlap with the region of input coupling grating 118 that receives light when scanning mirror is rotated (as depicted in FIG. 5A).

FIG. 5C shows a cross-sectional view of optical scanner 500, demonstrating how scanning mirror 506 can also rotate to the left about axis of rotation 312 or 330 by a scanning angle 510 to shift light emitted by optical fibers 502 to a left side of optical element 504. In this way, scanning mirror 506 and optical element 504 are able to distribute light 508 across an entire surface of input coupling grating 118.

Figure 6A:
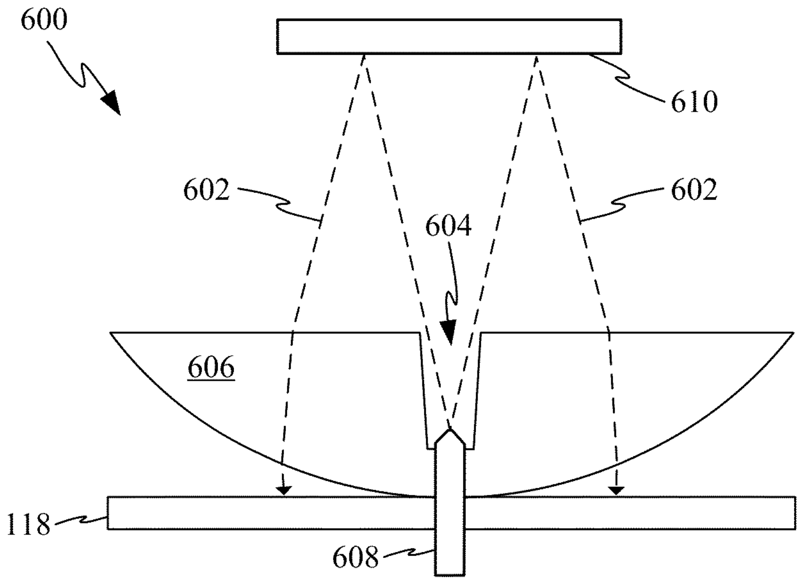
FIG. 6A shows a cross-sectional view of another optical scanner in a first configuration according to an embodiment of the present invention.
Figure 6B:
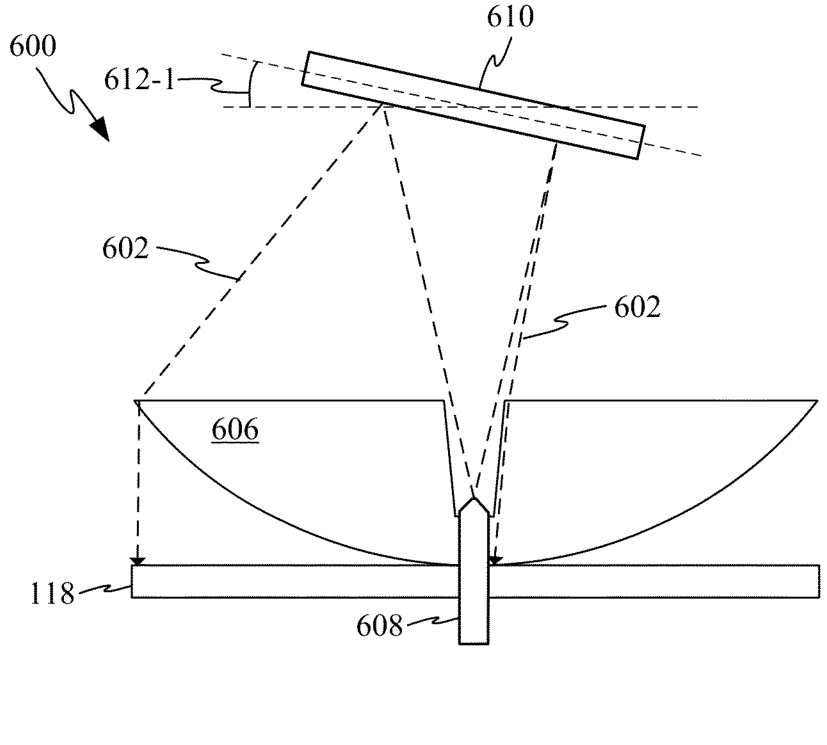
FIG. 6B shows a cross-sectional view of the optical scanner illustrated in FIG. 6A in a second configuration according to an embodiment of the present invention.
Figure 6C:
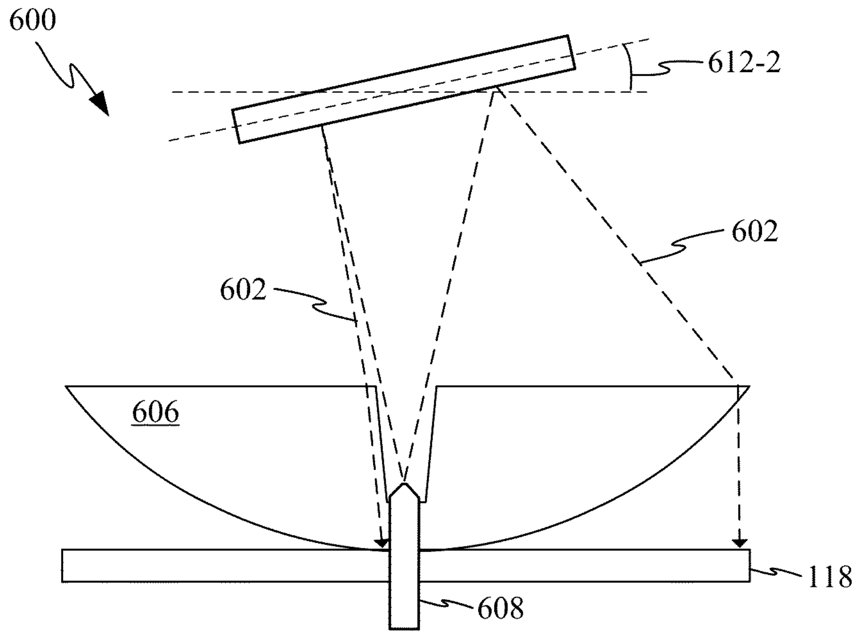
FIG. 6C shows a cross-sectional view of the optical scanner illustrated in FIG. 6A in a third configuration according to an embodiment of the present invention.

FIGS. 6A-6C illustrate an alternative embodiment of an optical scanner 600 in which light 602 is emitted through a central region 604 of an optical element 606 (i.e. lens) by an optical fiber or other light emitting component 608. In embodiments where light emitting component 608 takes the form of an optical fiber, the optical fiber can have a diameter of 80 microns. Central region 604 can include a channel sized to accommodate the passage of light emitting component 608 through optical element 606 and to prevent light 602 being emitted by light emitting component 608 from being refracted prior to arriving at scanning mirror 610. In some embodiments, the channel within central region 604 can have a diameter of about 2.5 mm. It should also be noted that light emitting component 608 also extends through an opening defined by input coupling grating 118. In some embodiments, light emitting component 608 may be positioned substantially parallel to input coupling grating such that light emitting component 608 does not extend through input coupling grating 118 but rather extends through optical element 606 and enters central region 604 from the side (e.g., right or left side).

FIG. 6A shows a cross-sectional view of optical scanner 600, demonstrating how light 602 is reflected by scanning mirror 610 and then refracted through optical element 606 prior to arriving at input coupling grating 118. In some embodiments, light emitting component 608 can take the form of a laser or LED with optics configured to spread light 602 across at least a substantial portion of a surface of scanning mirror 610, as depicted (also see description accompanying FIG. 4C). FIG. 6A also demonstrates how when scanning mirror 610 is oriented directly toward input coupling grating 118, light 602 can enter a central portion of input coupling grating 118.

FIG. 6B shows a cross-sectional view of optical scanner 600, demonstrating how light 602 emitted by light emitting component 608 can be biased to the left of input coupling grating 118 in accordance with a scanning angle 612-1 of scanning mirror 610. In some embodiments, the maximum angle of scanning angle 612-1 can be as large as about 13 degrees.

FIG. 6C shows a cross-sectional view of optical scanner 600, demonstrating how light 602 emitted by light emitting component 608 can be biased to the right of input coupling grating 118 in accordance with a scanning angle 612-2 of scanning mirror 610. In some embodiments, the maximum angle of scanning angle 612-2 can be similar to the maximum angle of scanning angle 612-1, i.e., about 13 degrees.

Figure 7A:
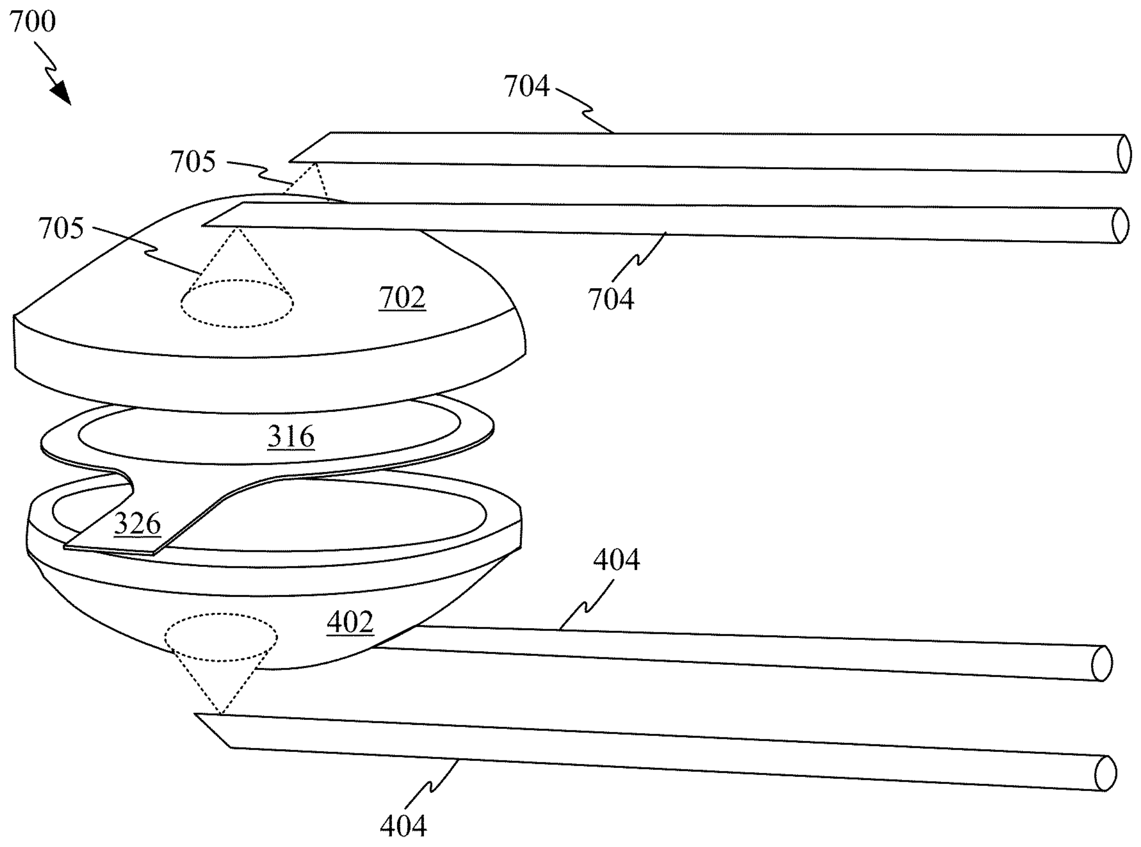
FIG. 7A shows a perspective view of an optical scanner in which optical elements are positioned on opposing sides of a scanning mirror according to an embodiment of the present invention.

FIG. 7A shows a perspective view of an optical scanner 700 in which optical elements 402 and 702 are positioned on opposing sides of scanning mirror 316. Various support structures have been removed to more clearly show the optical elements and scanning mirror. Light emitted by optical fibers 404 and optical fibers 704 can be directed in two different directions. In some embodiments, light 705 being directed through optical element 702 can act as an infrared illuminator for a depth detection or LIDAR system incorporated into an augmented reality system. Alternatively, light 705 being directed through optical element 702 can be directed toward a second depth plane, allowing scanning mirror 316 to concurrently direct light for two depth planes at once.

Figure 7B:
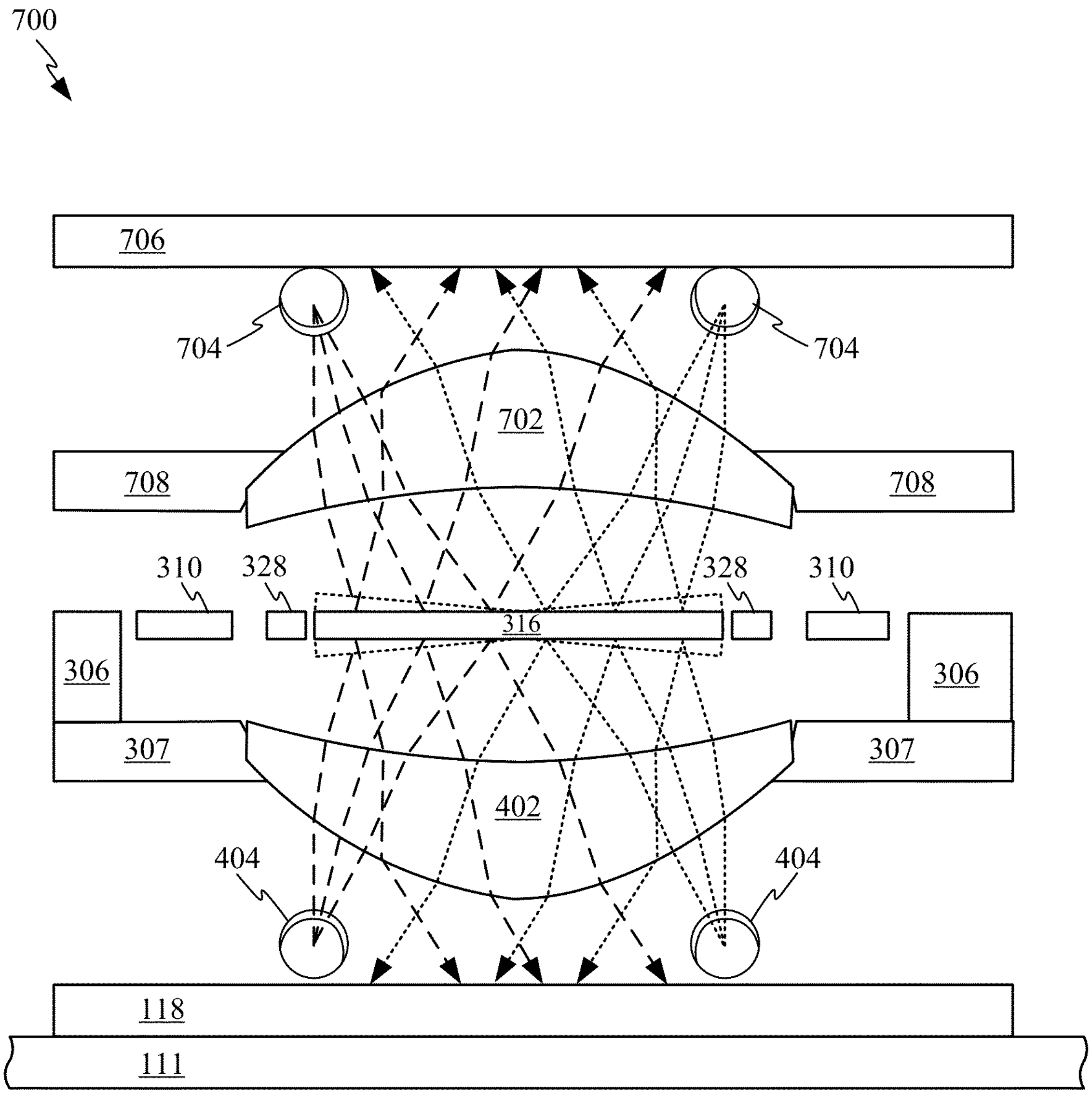
FIG. 7B shows a cross-sectional view of the optical scanner depicted in FIG. 7A.

FIG. 7B shows a cross-sectional view of optical scanner 700, demonstrating how light can be concurrently directed to two different input coupling gratings. In particular, light from optical fibers 404, which are located on a lower end of optical scanner 700 emit light that is reflected back into input coupling grating 118 by scanning mirror 316. In this embodiment, both sides of scanning mirror 316 are reflective. For this reason, light from optical fibers 704, positioned on an upper end of optical scanner 700 emit light that is reflected back into input coupling grating 706 by scanning mirror 316. In this way, a single optical scanner assembly with a single mirror can inject light from two different sources into two different layers of an augmented reality display assembly.

Figure 7C:
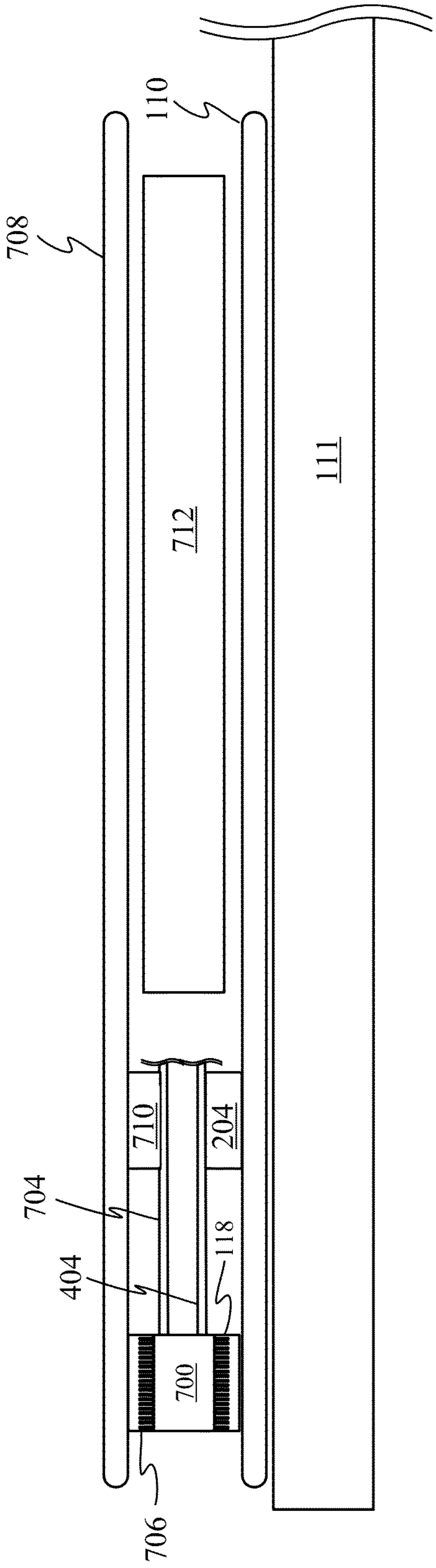
FIG. 7C shows a top view of an optical assembly in which the optical scanner depicted in FIGS. 7A-7B can be incorporated into an augmented reality display assembly.

FIG. 7C shows a top view of an optical assembly in which optical scanner 700 is incorporated. FIG. 7C shows one implementation in which optical scanner 700 could be incorporated into an augmented reality display assembly. In particular, optical scanner 700 is able to project light in opposite directions and into input coupling gratings 118 and 706. In this way, light from optical fibers 704 and 404 can be input into respective eyepieces 708 and 110, which are supported by optical frame 111. Optical fibers 704 and 404 could be coupled to eyepieces 708 and 110 by mechanical support structures 710 and 204. This configuration can be particularly space efficient when a space between eyepieces 708 and 110 is occupied by a lens or micro lens array 712. In some embodiments, micro lens array 712 can be configured to adjust or more clearly differentiate an apparent distance between images displayed upon eyepieces 708 and 110.

Figure 8:
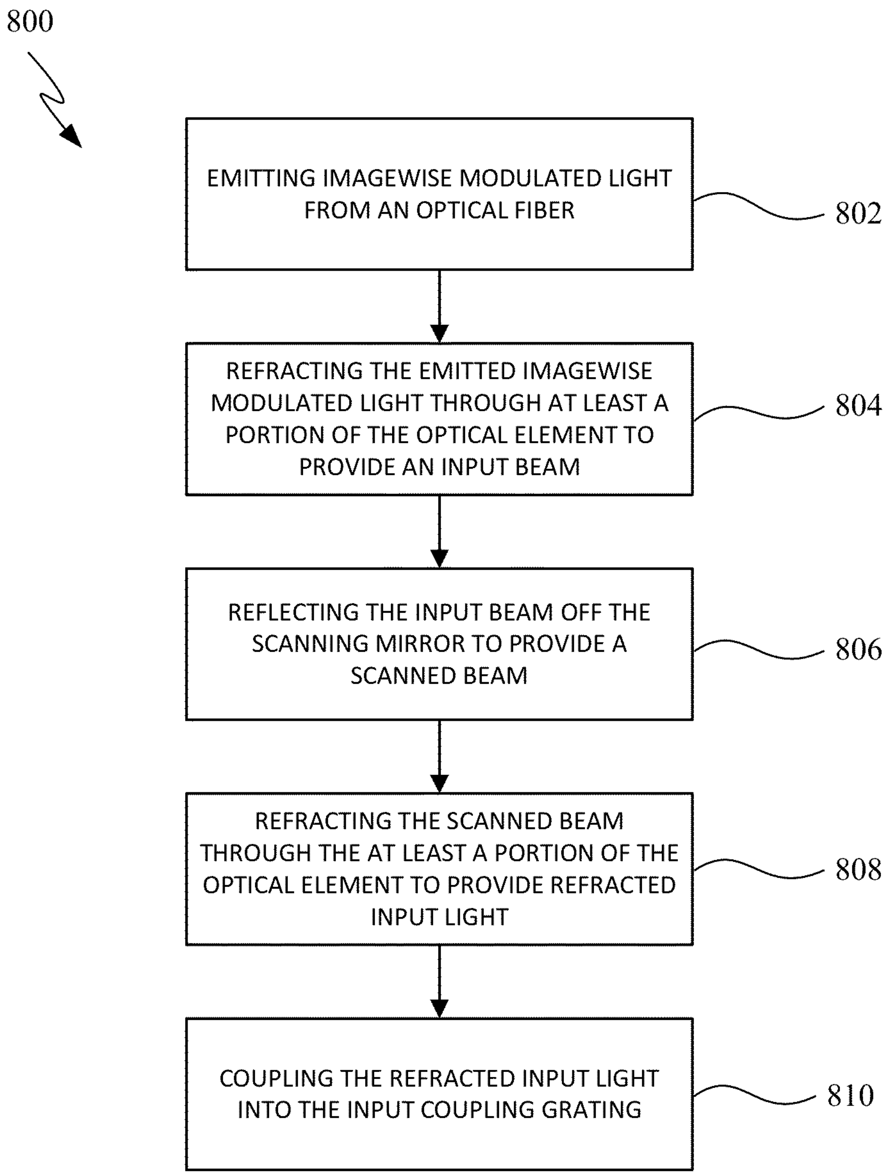
FIG. 8 shows a block diagram illustrating a method for operating a display assembly.

FIG. 8 shows a block diagram 800 illustrating a method for operating a display assembly. At 802, imagewise modulated light is emitted from an optical fiber. For example, as depicted in FIG. 4B, light rays may be emitted from one or more optical fibers 404 toward optical element 402. At 804, the emitted imagewise modulated light is refracted through at least a portion of an optical element to provide an input beam. For example, as depicted in FIG. 4B, the emitted light passes through optical element 402 and is redirected toward scanning mirror 316.

At 806, the input beam is reflected off a scanning mirror to provide a scanned beam. For example, as depicted in FIG. 4B, after the emitted light passes through optical element 402, the emitted light is reflected off scanning mirror 316 back downward toward optical element 402. Based on the rotation of scanning mirror 316, the emitted light can be reflected off scanning mirror 316 at various angles. At 808, the scanned beam is refracted through the at least a portion of the optical element to provide refracted input light. As depicted in FIG. 4B, the light that is reflected off scanning mirror 316 passes again through optical element 402 and is refracted through optical element 402. At 810, the refracted input light is coupled into the input coupling grating. As depicted in FIG. 4B, the light that passes through optical element 402 in the downward direction is coupled into input coupling grating 118.

It should be appreciated that the specific steps illustrated in FIG. 8 provide a particular method for operating a display assembly according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

An optical scanning assembly is disclosed and includes a scanning mirror; and a monocrystalline substrate. The monocrystalline substrate includes a peripheral region; and a mirror support region coupled to the peripheral region by a first flexure and a second flexure, the mirror support region being configured to rotate relative to the peripheral region about a first axis of rotation defined by the first and second flexures, the mirror support region comprising a mirror support structure coupled to the scanning mirror. The optical scanning assembly also includes a permanent magnet that emits a first magnetic field and is coupled to the monocrystalline substrate; and an electromagnetic coil disposed on the mirror support region and being configured to emit a second magnetic field that interacts with the first magnetic field to induce rotation of the mirror support region about the first axis of rotation.

In some embodiments, the mirror support structure comprises a first arm and a second arm that cooperatively define a second axis of rotation.

In some embodiments, the optical scanning assembly further comprises a piezoelectric film that imparts forces on portions of the mirror support region adjacent to the first and second arms to induce rotation of the scanning mirror about the second axis of rotation.

In some embodiments, the optical scanning assembly further comprises a sensor assembly adjacent to the first arm and configured to measure rotation of the scanning mirror about the second axis of rotation.

In some embodiments, the piezoelectric film extends across the first flexure and the electrically conductive pathways that couple the sensor assembly to a control system are positioned atop the piezoelectric film. A portion of the piezoelectric film insulates the electrically conductive pathways from the electromagnetic coil.

In some embodiments, the electromagnetic coil comprises a flat coil having concentric rings that are disposed upon a peripheral portion of the mirror support region.

In some embodiments, the mirror support region and the peripheral region of the monocrystalline substrate are coplanar when the optical scanning assembly is in a standby state In some embodiments, the permanent magnet is a first permanent magnet coupled to a first side of the monocrystalline substrate and the optical scanning assembly further comprises a second permanent magnet coupled to a second side of the monocrystalline substrate opposite the first side.

In some embodiments, the first and second permanent magnets cooperatively generate the first magnetic field.

An optical scanning assembly is disclosed and includes the following: a planar substrate, comprising: a peripheral region; a mirror support region coupled to the peripheral region by a first flexure and a second flexure, the mirror support region being configured to rotate relative to the peripheral region about an axis of rotation defined by the first and second flexures; a scanning mirror coupled to a central portion of the mirror support region; a permanent magnet that emits a first magnetic field and is coupled to the planar substrate; and an electromagnetic coil disposed on a peripheral portion of the mirror support region and being configured to emit a second magnetic field that interacts with the first magnetic field to induce rotation of the mirror support region about the axis of rotation.

In some embodiments, the axis of rotation is a first axis of rotation and wherein the scanning mirror is coupled to the mirror support region by two arms that cooperatively define a second axis of rotation orthogonal to the first axis of rotation.

In some embodiments, the peripheral region comprises a plurality of electrical contacts configured to receive power and signals from a processing device.

In some embodiments, the scanning mirror is configured to perform a raster scan that redirects and spreads light across an input coupling grating of an augmented reality device to produce an image.

In some embodiments, the optical scanning assembly further comprises an optical fiber configured to emit light that is reflected off the scanning mirror.

An augmented reality device is disclosed and includes the following: an optically transparent eyepiece configured to project light into a user's eye, the optically transparent eyepiece comprising an input coupling grating configured to receive light; an optical scanning assembly coupled to the eyepiece, the optical scanning assembly comprising: a planar substrate, comprising: a peripheral region; a mirror support region coupled to the peripheral region by a first flexure and a second flexure, the mirror support region being configured to rotate relative to the peripheral region about an axis of rotation defined by the first and second flexures; a scanning mirror coupled to a central portion of the mirror support region; a permanent magnet that emits a first magnetic field and is coupled to the planar substrate; and an electromagnetic coil disposed on a peripheral portion of the mirror support region and being configured to emit a second magnetic field that interacts with the first magnetic field to induce rotation of the mirror support region about the axis of rotation; and a light emitting component configured to direct light toward the scanning mirror so that the light is reflected off the scanning mirror toward and into the input coupling grating.

In some embodiments, the light emitting component comprises one or more optical fibers coupled to a source of imagewise modulated light.

In some embodiments, the augmented reality device comprises another optically transparent eyepiece.

In some embodiments, the planar substrate comprises a monocrystalline substrate.

In some embodiments, the axis of rotation is a first axis of rotation and wherein the scanning mirror is coupled to the mirror support region by two arms that cooperatively define a second axis of rotation orthogonal to the first axis of rotation.

In some embodiments, the augmented reality device further comprises a piezoelectric film configured to apply a force to the two arms to induce rotation of the scanning mirror about the second axis of rotation.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A display assembly, comprising:

an input coupling grating;

a scanning mirror configured to rotate about two or more different axes of rotation;

an optical element comprising a channel; and a light emitting component with a light emitting end disposed in the channel between the input coupling grating and the scanning mirror, wherein light emitted from the light emitting end is reflected off the scanning mirror, refracted through the optical element, and into the input coupling grating.

2. The display assembly of claim 1, wherein the light emitted from the light emitting end is refracted through at least a portion of the optical element prior to being reflected off the scanning mirror.

3. The display assembly of claim 1, wherein the light emitting component comprises an optical fiber.

4. The display assembly of claim 1, wherein the light emitting component comprises a laser or a light emitting diode including optics configured to spread the light emitted from the light emitting end across a portion of a surface scanning mirror.

5. The display assembly of claim 1, wherein the light emitted from the light emitting end passes through a central region of the optical element.

6. The display assembly of claim 1, further comprising an eyepiece, wherein the input coupling grating is configured to receive the light emitted from the light emitting end and transmit the received light into the eyepiece.

7. The display assembly of claim 1, wherein:

the light emitting component comprises an optical fiber of a plurality of optical fibers; and a first optical fiber of the plurality of optical fibers is parallel to a second optical fiber of the plurality of optical fibers.

8. The display assembly of claim 1, wherein the optical element is configured to at least partially collimate the light reflected off the scanning mirror prior to the light entering the input coupling grating.

9. The display assembly of claim 1, wherein the optical element comprises a lens having a convex surface oriented toward the input coupling grating.

10. The display assembly of claim 1, wherein the optical element is a first optical element and the display assembly further comprises a second optical element and wherein the scanning mirror is disposed between the first and second optical elements.

11. The display assembly of claim 10, wherein the scanning mirror has a first reflective surface oriented toward the first optical element and a second reflective surface oriented toward the second optical element.

12. The display assembly of claim 1, further comprising an actuator configured to rotate the scanning mirror about one of the two or more different axes of rotation.

13. The display assembly of claim 12, wherein the actuator comprises an electromagnetic actuator, wherein a magnet is positioned on either end of the scanning mirror, wherein:

the magnets emit a persistent magnetic field;

the persistent magnetic field is configured to interact with a shifting magnetic field emitted by an electromagnetic coil; and interaction between the persistent magnetic field and the shifting magnetic field induces rotation of the scanning mirror about an axis of rotation.

14. The display assembly of claim 12, wherein the actuator comprises one or more piezoelectric actuators, each of the one or more piezoelectric actuators having a spiral geometry.

15. A method of operating a display assembly having an input coupling grating, a scanning mirror, an optical element comprising a channel, and a light emitting component, the method comprising:

rotating the scanning mirror about two or more different axes of rotation;

emitting light from a light emitting end of the light emitting component, the light emitting end disposed in the channel between the input coupling grating and the scanning mirror;

reflecting the light off the scanning mirror;

refracting the light through the optical element; and inputting the light into the input coupling grating.

16. The method of claim 15, wherein the light emitted from the light emitting end is refracted through at least a portion of the optical element prior to being reflected off the scanning mirror.

17. The method of claim 15, wherein the light emitting component comprises an optical fiber.

18. The method of claim 15, wherein the light emitting component comprises a laser or a light emitting diode including optics configured to spread the light emitted from the light emitting end across a portion of a surface scanning mirror.

19. The method of claim 15, wherein the light emitted from the light emitting end passes through a central region of the optical element.

* * * * *